Oct. 8, 1968 R. H. MILLER ETAL 3,404,650
SYSTEM AND APPARATUS FOR TRANSLATING AND DISCHARGING A LOAD
Filed April 14, 1965 10 Sheets-Sheet 8
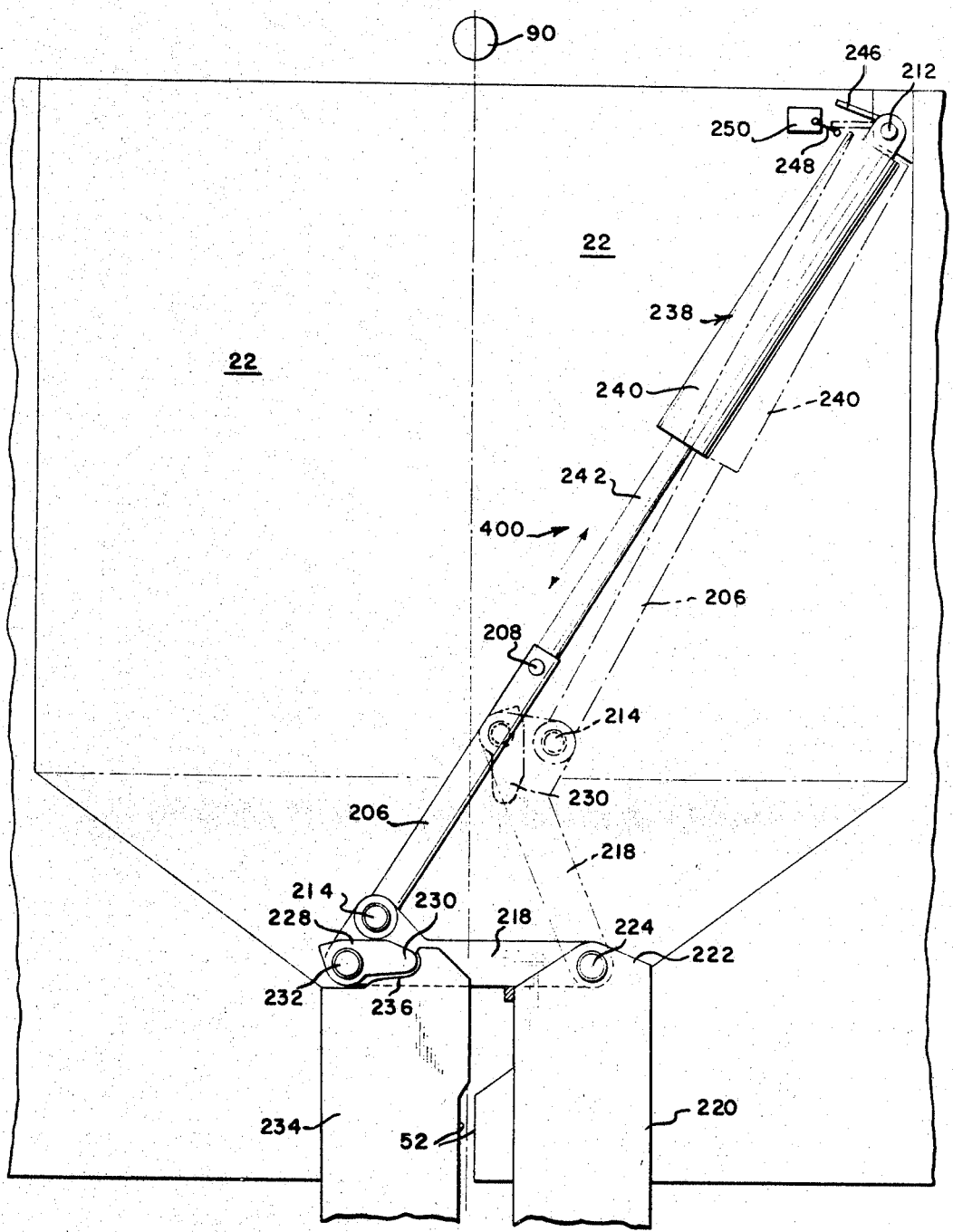
FIG. 13
INVENTORS
ROBERT H. MILLER
ARTHUR J. ZUEHLKE
BY 
ATTORNEY Oct. 8, 1968  R. H. MILLER ETAL  3,404,650
SYSTEM AND APPARATUS FOR TRANSLATING AND DISCHARGING A LOAD
Filed April 14, 1965  10 Sheets-Sheet 9

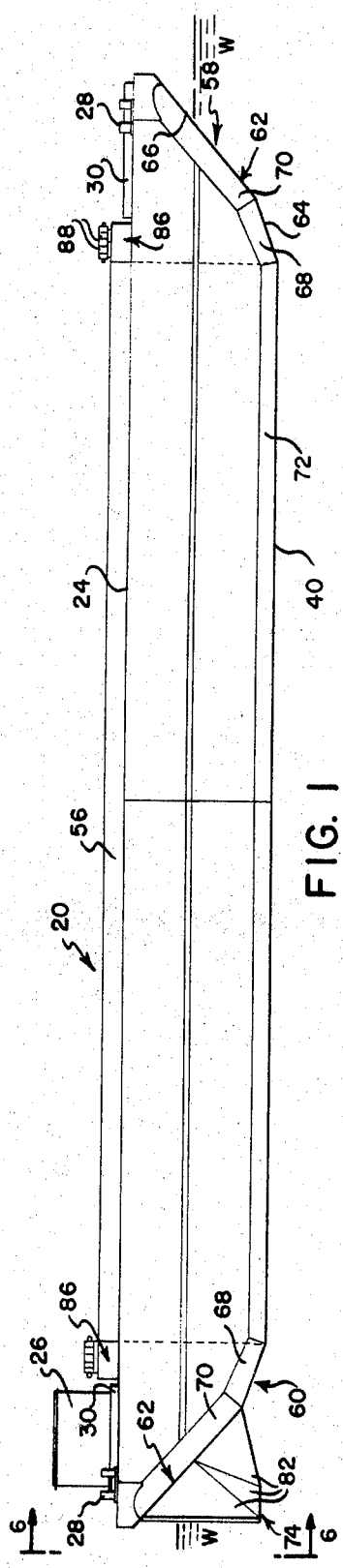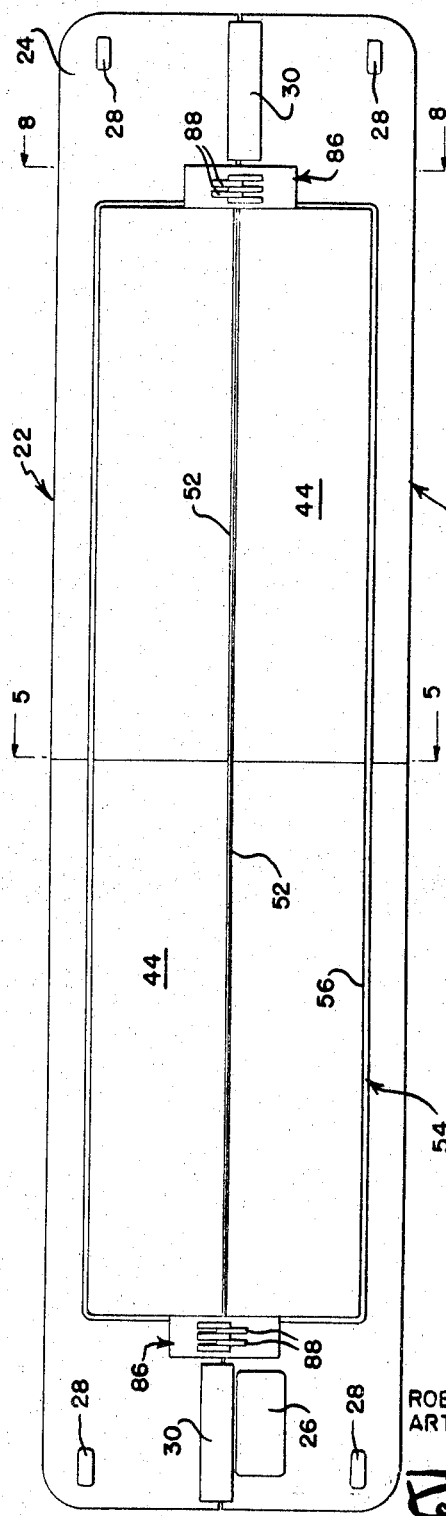

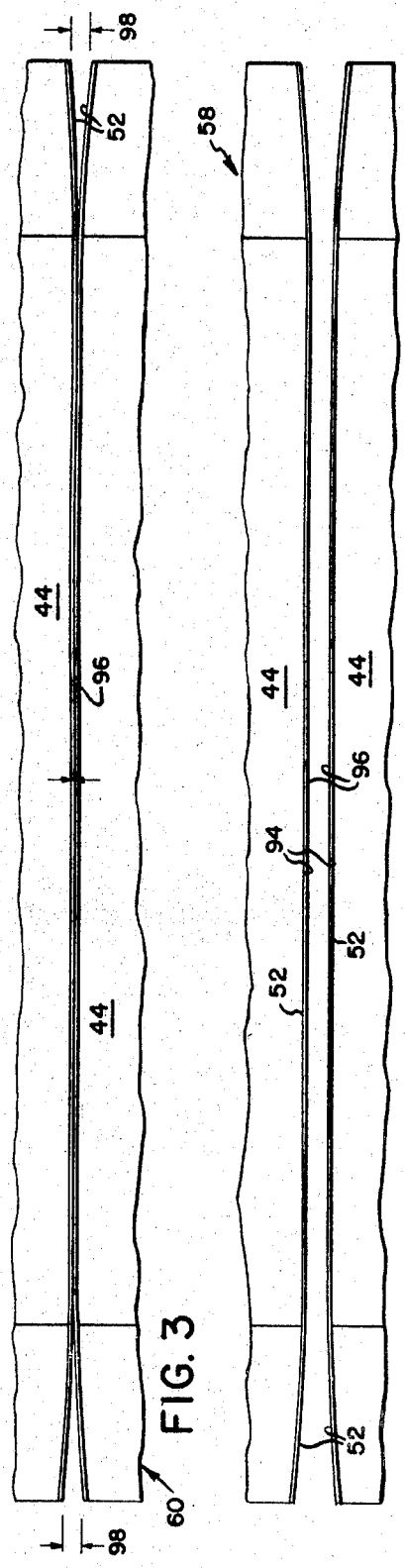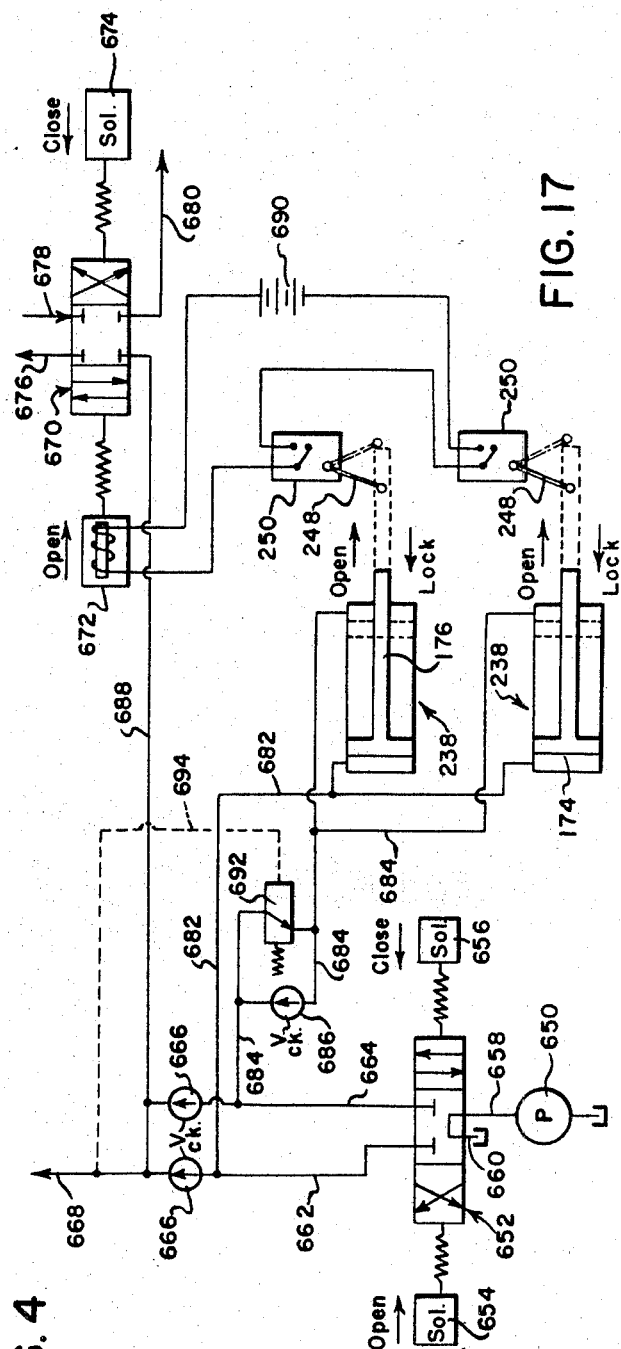

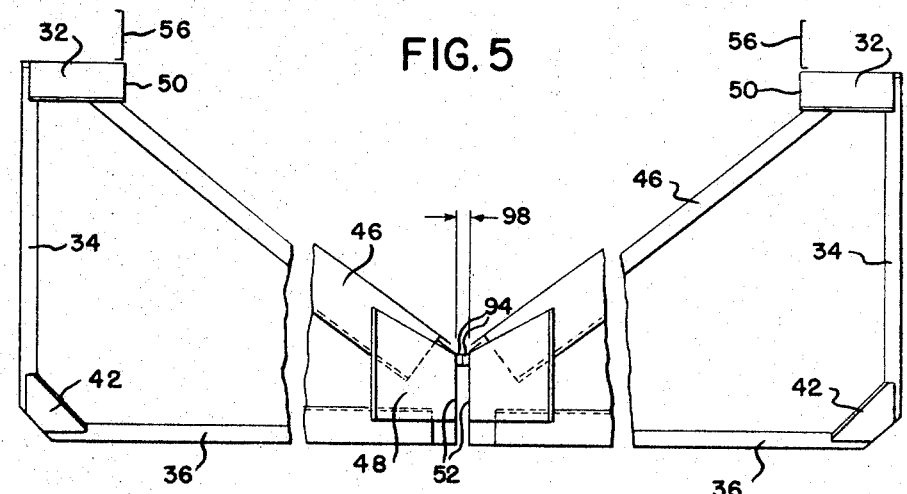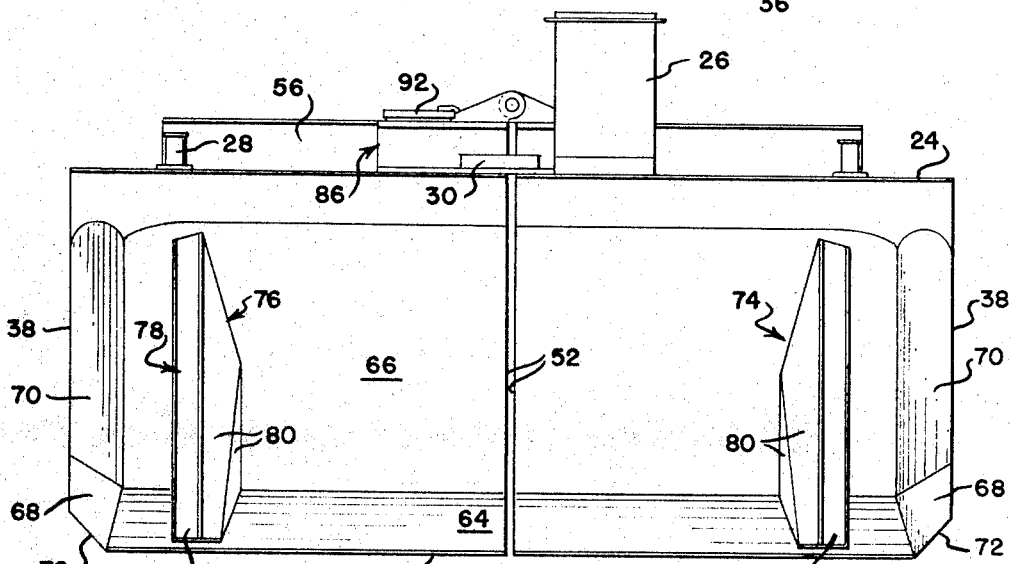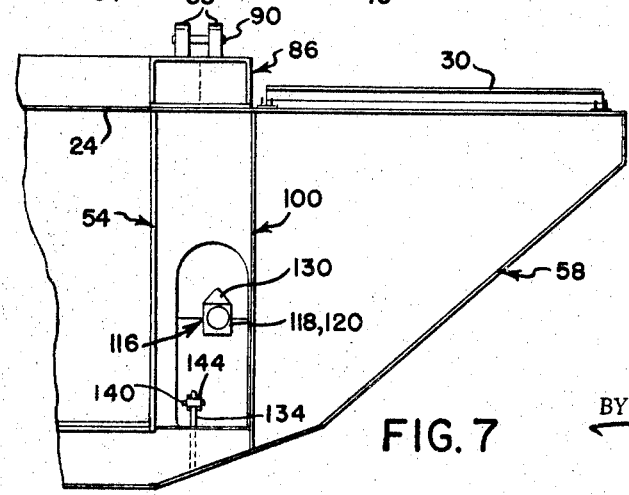

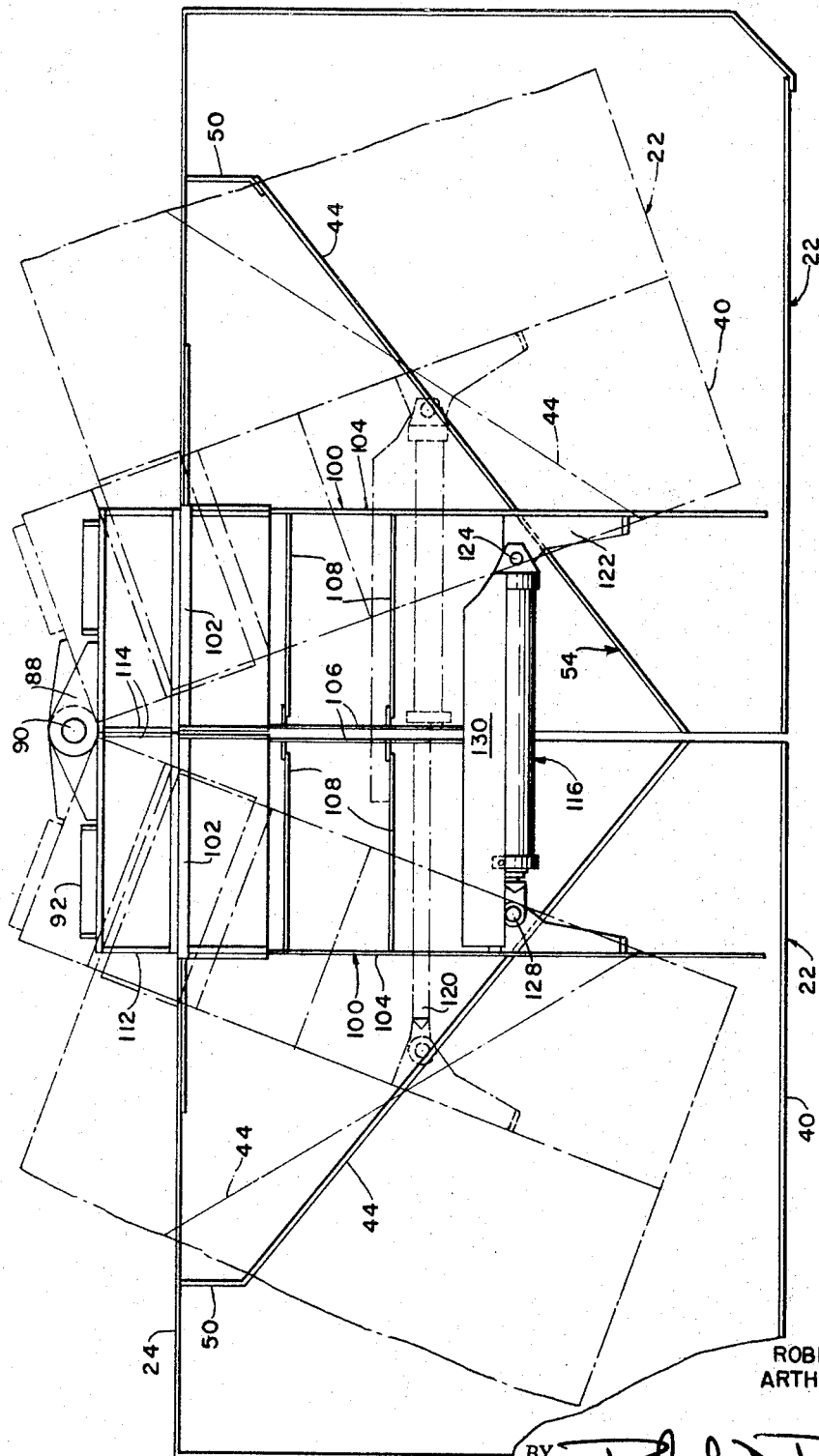

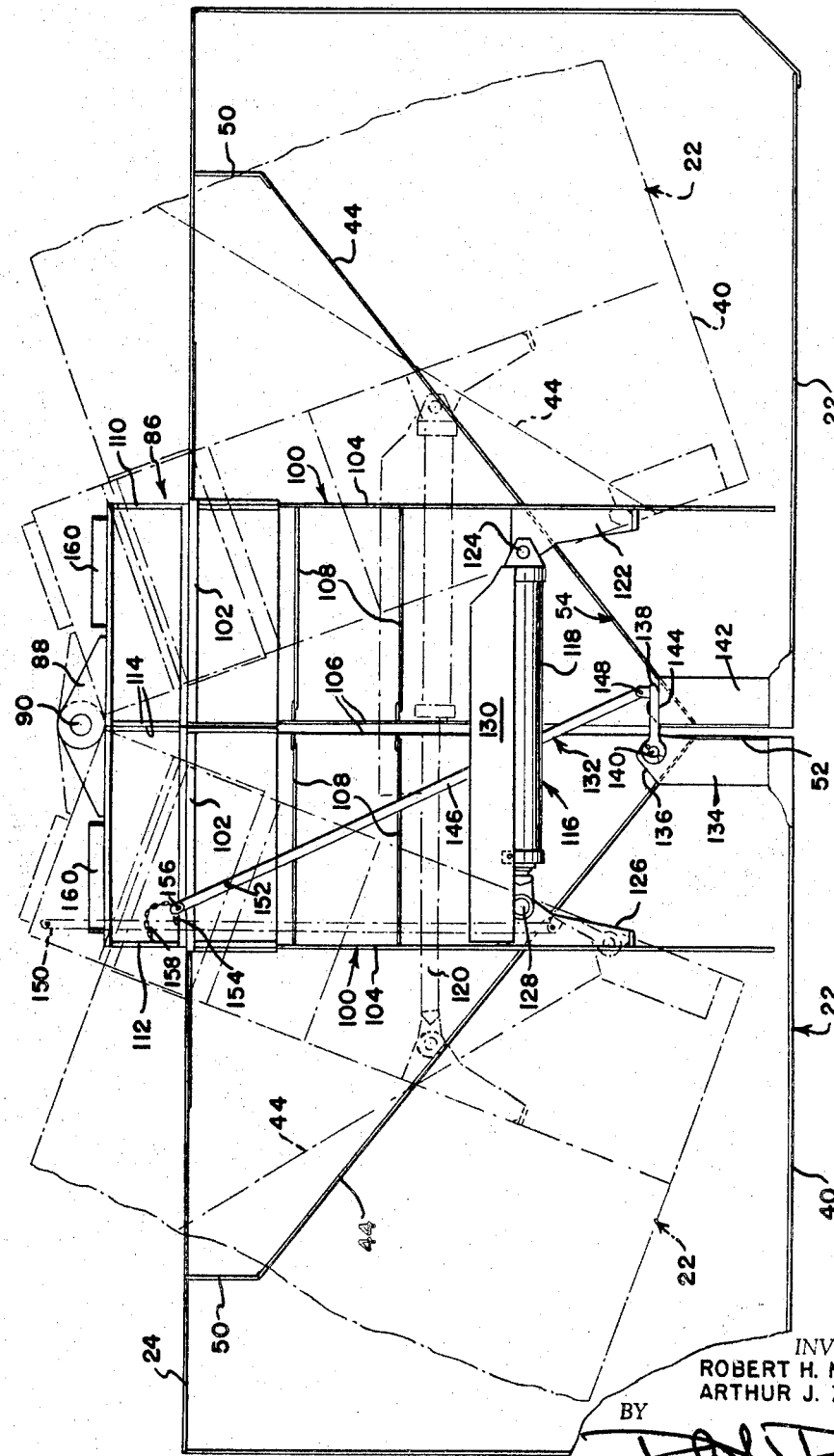

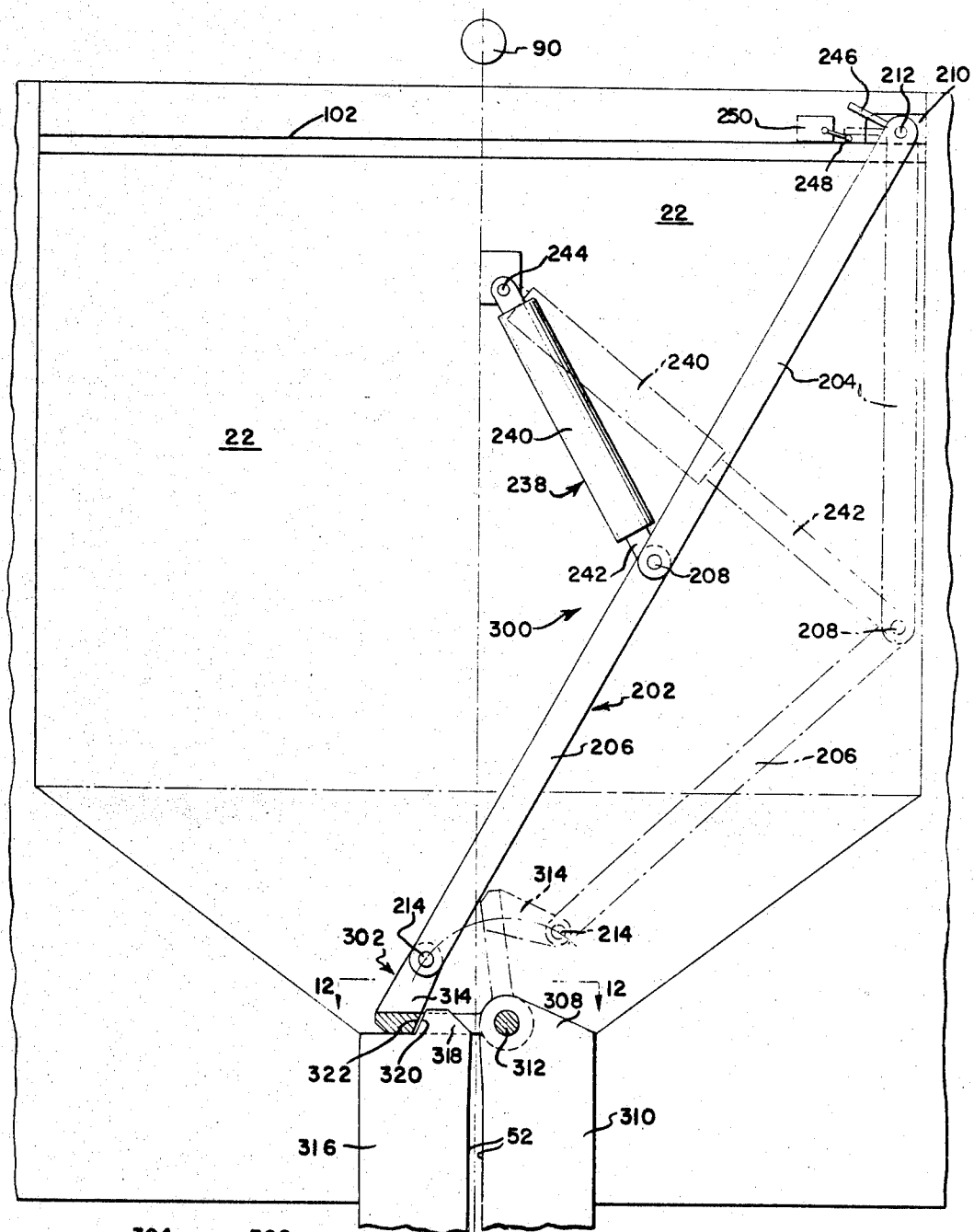

INVENTOR
ROBERT H. MILLER
ARTHUR J. ZUEHLKE

BY
ATTORNEY

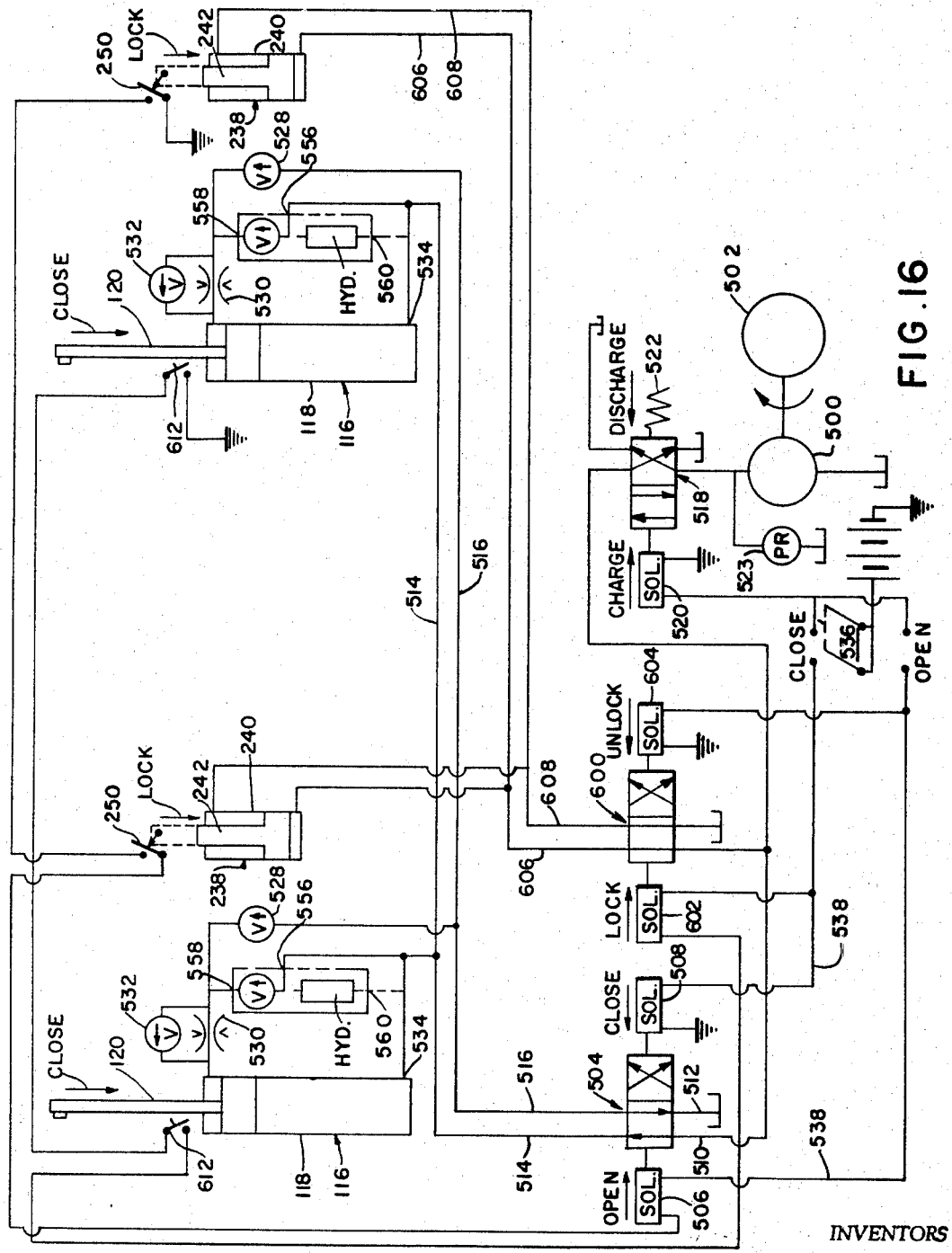

3,404,650
SYSTEM AND APPARATUS FOR TRANSLATING AND DISCHARGING A LOAD
Robert H. Miller and Arthur J. Zuehlke, Manitowoc, Wis., assignors to Manitowoc Shipbuilding Inc., Manitowoc, Wis., a corporation of Wisconsin
Filed Apr. 14, 1965, Ser. No. 447,992
29 Claims. (Cl. 114—29)

ABSTRACT OF THE DISCLOSURE

This invention relates to a vessel for moving and discharging a load comprised of a plurality of buoyant load-carrying portions pivoted together in such a manner that, when empty, the load-carrying portions inherently assume a closed bottomed receptacle. When the vessel is loaded, the load-carrying portions tend to separate to discharge the material between the load-carrying portions. Means are provided for holding the load-carrying portions in the closed position to allow the vessel to move from one location to another without discharging the material. Means are also provided for ensuring a tight fit between the load-carrying portions in order to prevent leakage of the carried material therebetween.

---

The present invention relates, generally, to a method, system and apparatus for translating a load from one location to another, and/or for discharging such load therefrom at a selected location.

More particularly, this invention pertains to a vehicle having a plurality of complementary load-carrying portions which may assume a plurality of attitudes or positions with respect to one another wherein the portions in one of the positions presents a pre-loading force with respect to each other for enabling the vehicle to sustain substantially increased maximum loads that are not undesirably or inadvertently diminished by leakage, seepage, and the like, prior to discharging the load from the vehicle.

More particularly, this invention pertains to a vehicle or to a vessel particularly adapted to be used on a body of water, for translating a load from one location to another, and/or for discharging such load therefrom wherein the vehicle or the vessel is so constructed, configured and arranged as to present a plurality of complementary load-carrying portions that inherently tend to assume at least one of a plurality of attitudes or positions with respect to one another, and inherently tend to assume another of said plurality of attitudes under the influence of the load with the portions in the one position presenting a preloading force with respect to one another, enabling the vehicle or the vessel to sustain substantially increased maximum loads that are not undesirably or inadvertently diminished by leakage, seepage, and the like, prior to reaching a selected location, and being structurally, operatively associated with hydraulic assemblies for controlling the rate of and assisting the translation of the portions between the positions thereof, without necessitating the use of a constantly operable external power source, such as a diesel engine, enabling the motion of the portions in being translated between the positions to be smooth and positive under any and all conditions, and further enabling the vehicle or the vessel to present substantially increased capacities for the aforesaid loads.

It has heretofore been suggested that dumping vehicles or vessels be provided for conveying earth, stone, garbage, and other materials, and to dump or discharge these materials when a selected location or destination has been reached. The vehicles and the vessels, such as barges and scows, for performing these functions that are presently available are, for example, so constructed and arranged as to provide a number of wells at intervals throughout the length thereof. Pivoted dumping doors have been provided in the wells to support and dump the contents thereof, but the vehicles or the vessels have been unsatisfactory because the dumping doors cannot readily be maintained in a condition to operate efficiently. In addition, the allowable area of each door is practically limited so that a large number of wells and dumping doors are necessary in a vehicle or vessel of given length.

In order to overcome the disadvantages as recited above, it has also been heretofore suggested that a vehicle in the form of a vessel such as a barge or scow be provided with a plurality of complementary buoyant parts particularly adapted, when in certain relative positions, to form a hold to receive the materials to be transported, and to assume automatically certain other positions in which the contents of the hold may be dumped. In the prior known type of vehicles or vessels, in order to retain the complementary parts in a load carrying position, mechanical restraining devices are usually mounted on the deck of the barge or scow. When the restraining device is released, the vessels tend to pivotally move apart, so that the contents thereof may be discharged. However, little, if any, control over the rate of pivotal movement of the parts of the vessels is provided. And, where some control for the rate of pivotal movement of the parts of the vessel is provided, additional mechanical devices are usually required, the same also being mounted on the deck of the barge or scow. Still further, while the complementary buoyant parts of the vessels are so constructed and arranged as to tend to assume a load carrying position as aforesaid, apparatus is required for completing the movement to this position. Once again, the use of space on the deck of the barge or scow is necessitated. Moreover, in order to operate all of the mechanical devices and apparatus for performing the functions hereinbefore set forth, an external power source, such as a diesel engine, is also mounted on the deck. Accordingly, it can be seen that notwithstanding the efforts made to overcome the disadvantages of the earlier dump barges or scows heretofore suggested, those presently available still present limited carrying capacities. In addition, due to the quantity of equipment mounted on the deck thereof, the complementary buoyant parts of the vessels can only be loaded from one, or at the most, a very few directions.

In attempting to present maximum load carrying capacities, dump barges or scows as are presently available are constructed of substantial longitudinal dimensional extents or lengths. Since the vessels are fabricated of sheet steel, or other similar material, enabling them to present this buoyant characteristic, it will be understood that a load applied to the bottom wall thereof, especially along the edges of such walls that may be disposed in mating mutual cooperative engagement with one another, thus defining the load carrying position of the vessels, will tend to bend the walls, with the result that the load will be decreased by leakage, seepage, and the like, before the desired dumping or discharge location is reached. And, this is true notwithstanding the provision of a restraining device on the deck of the scow which tends to perform the function of maintaining the vessels in the load carrying position, in the manner aforesaid.

Having in mind that each and every one of the aforesaid disadvantages, and others that will be readily apparent to those skilled in the art, it is a primary object of the present invention to provide a vehicle, or a vessel which may be used on a body of water, for translating a load from one location to another, and/or discharging such load therefrom, wherein the vehicle or the vessel is so constructed, configured and arranged as to present a plurality of complementary buoyant load carrying portions that inherently tend to assume at least one of a plurality of attitudes or positions with respect to one another, and inherently tends to assume another of said plurality of positions or attitudes under the influence of a load, with the portions in said one position or attitude presenting a pre-loading force with respect to one another for enabling the vehicle or the vessel to sustain substantially increased maximum loads that are not undesirably or inadvertently diminished by leakage, seepage, and the like, prior to reaching a selected location, and being structurally operatively associated with hydraulic assemblies for controlling the rate of and assisting the translation of the portions between the attitudes or positions thereof, for maintaining the portions in the one position or attitude without necessitating the use of a constantly operable external power source, such as a diesel engine, for enabling the motion of the portions in being translated between said positions or attitudes to be smooth and positive under any and all conditions, and further enabling the vehicle or the vessel to present substantially increased capacities for the aforesaid loads.

Another primary object of this invention is to provide a vehicle or a vessel to be used on a body of water, for translating a load from one location to another, and/or discharging the same therefrom wherein the vehicle or the vessel is so constructed, configured and arranged as to present a plurality of complementary load carrying portions which may assume a plurality of positions with respect to one another with the portions each comprising a curvilinear mating edge disposed in abutting mutual cooperative engagement with one another, when the portions are disposed in a first or load carrying position of the plurality of positions, to introduce a pre-loading force in the first position between the portions along the mating edges thereof for enabling the vehicle or the vessel to sustain substantially increased maximum loads that are not undesirably or inadvertently diminished by leakage, seepage, and the like, prior to reaching a selected location, with the portions being further, structurally operatively associated with hydraulic assemblies for controlling the rate of and assisting the translation of the portions between the positions thereof with the motion of the portions in being translated between the positions to be smooth and positive under any and all conditions, and further enabling the vehicle or the vessel to present substantially increased capacities for the aforesaid loads.

Yet another primary object of the present invention is to provide a vehicle, or a vessel particularly adapted to the use on a body of water, for translating a load from one location to another, and/or discharging the same therefrom, wherein the vehicle or the vessel is so constructed, configured and arranged as to present a plurality of complementary load carrying portions that inherently tend to assume at least one of a plurality of attitudes or positions with respect to one another, and inherently tend to assume another of the plurality of attitudes or positions under the influence of a load with the portions each comprising a curvilinear mating edge disposed in abutting mutual cooperative engagement with one another, when the portions are disposed in the aforesaid one position, to introduce a pre-loading force in the one position between the portions along the mating edges thereof for enabling the vehicle or the vessel to sustain substantially increased maximum loads that are not undesirably or inadvertently diminished by leakage, seepage, or the like, prior to reaching a selected location, with the portions, further, being structurally operatively associated with hydraulic assemblies for controlling the rate of and assisting the translation of the portions between the positions thereof, and the hydraulic assemblies are so constructed and arranged as to be capable of operation from a remote point without necessitating the use of a constantly operable external power source, such as a diesel engine, to enable the rate of translation to be adjusted with facility, and even terminating before the translation between the positions is completed to regulate the rate of discharge of material from the vehicle or the vessel without requiring an operator to be present thereupon, and further enabling a controlled rate of discharge of material for spreading the same with the vehicle or the vessel thereby being capable of presenting substantially increased capacities for the loads in the absence of the usual hopper doors, chains, wire ropes, die castings, and additional machinery and equipment.

Furthermore, a primary object of the present invention is to provide a vessel particularly adapted to be used on a body of water for translating a load from one location to another, and/or for discharging the same therefrom, wherein the vessel is so constructed, configured and arranged as to present a plurality of complementary buoyant load carrying portions that inherently tend to assume at least one of a plurality of attitudes or positions with respect to one another, and inherently tend to assume another of the plurality of attitudes or positions under the influence of a load with the portions each comprising a curvilinear mating edge disposed in abutting mutual cooperative engagement with one another, when the portions are disposed in the one position, to introduce a pre-loading force in the one position between the portions along the mating edges thereof, with the portions, further, being structurally operatively associated with hydraulic assemblies for controlling the rate of and assisting the translation of the portion between the positions thereof, and comprising hydraulically operable locking structure for bringing the mating edges into the aforesaid relationship with respect to one another to introduce the pre-loading force, and for retaining the portions in the one of the plurality of positions, with the hydraulic assemblies being so constructed and arranged as to be capable of operation from a remote point, all without necessitating the use of a constantly operable external power source, while enabling the rate of translation to be adjusted with facility, and even terminated before the translation between positions is completed to regulate the rate of discharge of material from the vessel without requiring an operator to be present thereupon, and further enabling a controlled rate of discharge of material for spreading the same and lining harbor bottom, with the apparatus thereby being capable of presenting substantially increased capacities for the loads in the absence of the usual hopper doors, chains, wire ropes, die castings and additional deck mounted machinery and equipment, and thereby substantially reducing costs and maintenance, while further enabling the vessel to be loaded from any one of a plurality of more convenient directions.

While in the description following, and in the drawing, the invention is described and illustrated as applied to a vessel, it is to be understood that this invention is equally applicable to many other classes of vehicles, suitably modified as will be readily apparent to one skilled in the art.

Other objects and important features of the present invention will be apparent from a study of the specification following taken with the drawing, which together show, illustrate, describe and disclose certain preferred embodiments or modifications of the invention and what is now considered to be the best mode of practicing the principles thereof. Other embodiments and modifications may be suggested to those having the benefit of the teachings herein, and such other embodiments or modifications are intended to be reserved especially as they fall within the scope and spirit of the sub-joined claims.

In the drawing:

FIGURE 1 is a side elevational view of a vehicle in the form of a vessel constructed in accordance with the principles of the present invention;

FIGURE 2 is a plan view of the vehicle or vessel illustrated in FIGURE 1;

FIGURE 3 is a detail view of certain component parts of the vehicle or vessel illustrated in FIGURES 1 and 2, wherein the component parts are illustrated in mutual cooperative engagement with one another;

FIGURE 4 is a view similar to FIGURE 3, but illustrating the component parts as being separably disposed with respect to one another;

FIGURE 5 is a cross-sectional view, taken along the line 5—5 of FIGURE 2 looking in the direction of the arrows and illustrating certain interior details of construction;

FIGURE 6 is and end elevational view of the vehicle or vessel illustrated in FIGURES 1 and 2, taken along the line 6—6 looking in the direction of the arrows, that is, when viewing the vehicle or vessel from generally rearwardly thereof;

FIGURE 7 is a partial side elevational view, illustrating certain interior details of construction of the vehicle or vessel;

Figure 10:
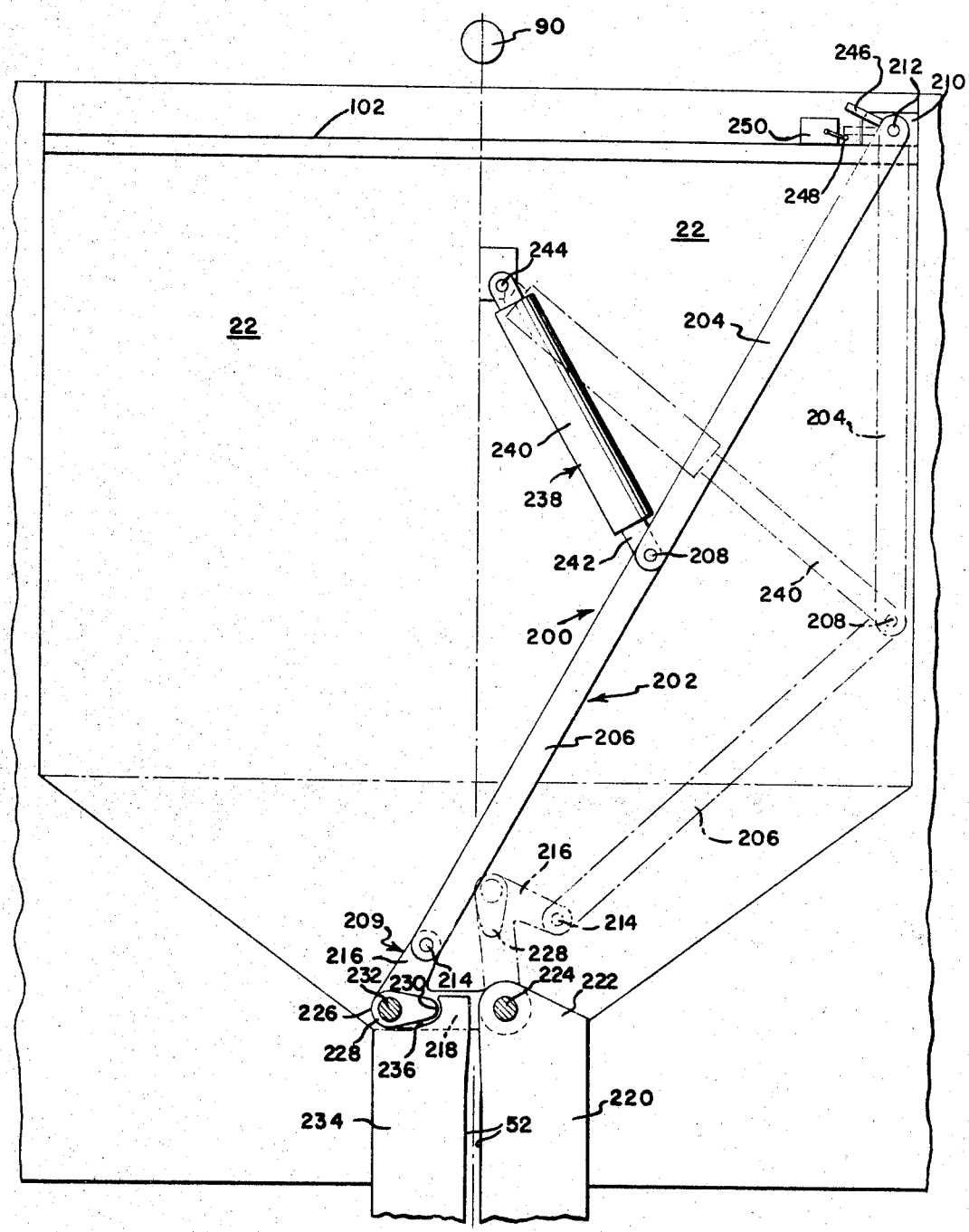
Figure 14:
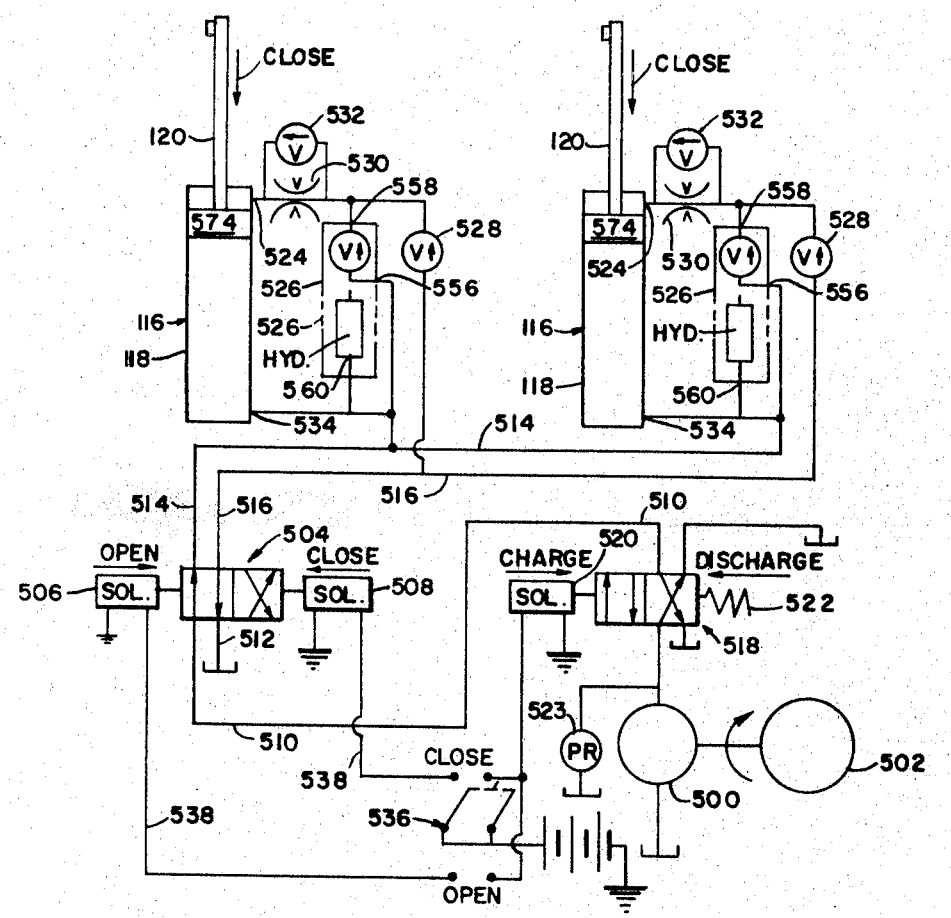
Figure 15:
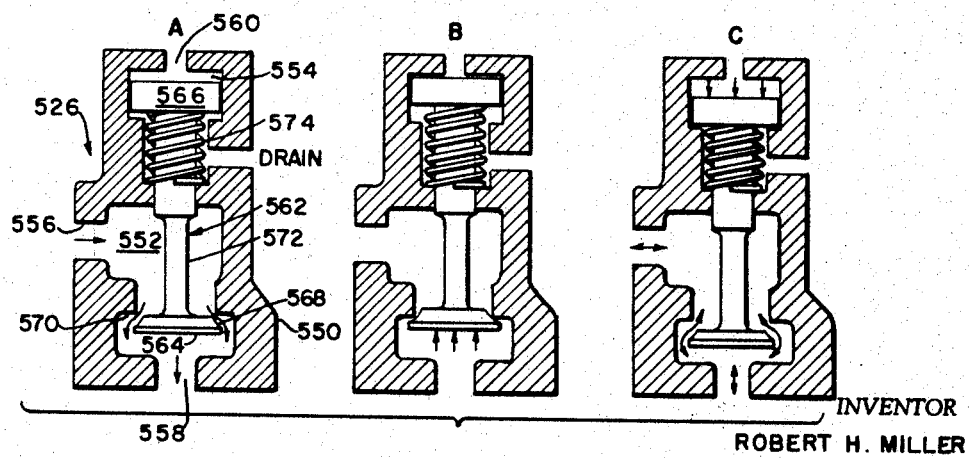

FIGURE 8 is a cross-sectional view, take along the line 8—8 of FIGURE 2, looking in the direction of the arrows and illustrating in full lines certain component parts of the vehicle or vessel when disposed in one of a plurality of positions, and further illustrating a hydraulic assembly for controlling the rate of and assisting the translation of the component parts between the pluarity of positions;

FIGURE 9 is a view similar to FIGURE 8 but illustrating one embodiment of a locking structure for retaining the component parts in the one of the plurality of positions;

FIGURE 10 is a view similar to FIGURES 8 and 9 but illustrating another embodiment of the locking structure;

FIGURE 11 is a view similar to FIGURES 8, 9 and 10 but illustrating yet another embodiment of the locking structure;

FIGURE 12 is a cross-sectional view taken along the line 12—12 of FIGURE 11 looking in the direction of the arrows;

FIGURE 13 is a view similar to FIGURES 8, 9, 10 and 11 but illustrating still another embodiment of the locking structure;

FIGURE 14 is a schematic view of a hydraulic circuit or system for controlling the rate of translation and to provide locking apparatus for maintaining the component parts of the vehicle or vessel in the one position;

FIGURE 15 is a cross-sectional view of pilot operated check valving suitable for use in the hydraulic circuit or system of FIGURE 14;

FIGURE 16 is a schematic view of a hydraulic circuit or system in which the locking structure is partcularly intended to be disposed, and FIGURE 17 is a schematic view of another hydraulic circuit or system in which the locking structure is particularly intended to be disposed.

Attention is now directed to the drawing wherein there is illustrated a vehicle 20 for translating a load from one location to another and for discharging such load, if desired, at any selected location.

The vehicle 20 is, for the sake of illustration, shown in the form of a vessel for use on a body of water W but it is to be understood that other forms of vehicles which are employed for carrying, transporting, hauling, translating discharging, etc., loads of material may be provided with the principles of construction as described, disclosed, illustrated, shown and claimed in this application without departing from the inventive concept hereof.

The vehicle or vessel 20 comprises a plurality of generally rectangular longitudinally dimensionally extensive load carrying portions 22. Each of these portions are of the same general configuration, and, therefore, are complementary with respect to one another. In addition, since, when considered conjointly, the portions 22 comprise the vehicle or vessel 20, which in the form as illustrated is particularly adapted to be self-supporting on the body of water W, and therefore are fabricated of any suitable material for that purpose, such as sheet metal, each of the portions 22 in the preferred embodiment as illustrated may be considered as buoyant. Accordingly, as illustrated, the portions 22 define a plurality of complementary buoyant load carrying hull halves or portions to be described more fully hereinafter.

As illustrated, each of the portions 22 of the vehicle or vessel 20 comprise a generally horizontally disposed planar surface or deck 24, an engine house 26 is positionable upon the deck 24, in which there may be disposed a power source, such as a diesel engine (not shown), and a pump (not shown). Additionally, mooring bitts 28 of any suitable construction may be fixably positioned upon the deck 24, for use when it is desired to moor the vessel 20 at a desired location, as well as to perform other functions, such as those hereinafter set forth.

Other and additional equipment may be mounted or positioned upon the surface or deck 24, such as suitable gratings 30, for defining a walkway when the buoyant sections or hull halves 22 are disposed in a particular one of a plurality of positions, to be described more fully hereinafter. It is to be remembered, however, that a principle of the present invention is to present a vehicle, such as the vessel 20, having a surface, such as the deck 24, that is substantially clear and unobstructed. Accordingly, as little additional equipment other than that described above is positioned thereupon.

With particular reference now to FIGURE 5 of the drawing, it will be seen that each portion or hull half 22 is comprised of a longitudinally dimensionally extensive upper frame member 32 that defines the surface or deck 24, a generally vertically extending frame member 34, and a longitudinally dimensionally extensive lower or bottom frame member 36. The frame members 34 define the sides 38, and the frame members 36 define the bottom 40 of the hull of the vessel 20. The frame members 34 and 36 may be structurally operatively associated with one another in any suitable manner, as by means of a gusset plate 42.

Additionally, each portion or hull half 22 is comprised of a generally downwardly and inwardly inclined load carrying wall 44 (see, for example, FIGURES 2 and 8 of the drawing) defined by a similarly disposed frame member 46. The frame member 32 performs the function of a gusset plate to structurally operatively associate the member 46 with the member 34. A gusset plate 48 is provided at an opposite end of the frame member 46 to structurally operatively associate or connect the same to the frame member 36.

It will now be understood that each portion or hull half 22 defines an area which is of generally triangular configuration in cross section. However, the frame member 46 is not extended to each of the frame members 32 and 36. Accordingly, there is defined a generally vertically extending enclosure wall 50, and a generally vertically extending mating wall 52, these two walls being disposed generally in spaced parallel relationship with respect to one another (see, for example, FIGURES 5, 6 and 8).

The enclosure walls 50 and the load carrying wall 44 define a generally triangularly configured enclosure 54 for retaining and confining a load therewithin, such as gavel, earth, stone, piping and the like. In order to preclude this material, and especially one having characteristics similar to a pulverulent material, from entering upon or obstructing the surface or deck 24, the wall 50 is extended generally vertically outwardly therefrom by means of a bulwark 56.

As pointed out hereinbefore, the vehicle 20 is illustrated as a vessel for use in the body of water W. However in any form, the vehicle 20 is to be translated from one location to another either as a self-propelled vehicle or by means of an external power source, or prime mover such as a truck or tug. Accordingly, it will be understood that in the vessel 20 each of the load-carrying portions or hull halves 22 must be so configured and arranged as to facilitate translation by towing, and the like. To this end, each hull half, in addition to the manner in which they are fabricated, as hereinbefore set forth, comprises a bow or leading end 58 and a stern or trailing end 60. (See, for example, FIGURE 1). Each end is defined by the walls 38, and a bottom wall 62. The bottom wall 62 extends upwardly and outwardly from the bottom wall 40 and, in turn, is therefore defined by a plurality of wall surfaces 64 and 66 disposed in substantially obtuse angular relationship with respect to one another. In addition, the surface 64 is disposed in obtuse angular relationship with respect to the wall 40, and the wall 66 in an acute angular relationship with respect to the surface or deck 24.

To further enhance the ability of being able to, for example, tow the vessel 20, that is, to further enhance the hydrodynamic characteristics thereof, a plurality of side surfaces 68 and 70 are disposed to extend between the wall surfaces 64 and 66, respectively, and the side walls 38. More particularly, these side surfaces 68 and 70 are disposed in angular relationship with the corresponding wall surfaces, as well as with the side walls. Carrying this hydrodynamic principle still further, an angularly disposed side wall 72 is disposed to extend between the bottom wall 40 and the side wall 38 to correspond generally with the longitudinal dimensional extent or length of the bottom wall 40.

In addition, each hull half 22 comprises a skeg 74 structurally operatively associated with the trailing end 60, and, in particular, with respect to and along the wall surfaces 66 of the bottom wall 62 thereof. Each skeg 74 is hydrodynamically configured and arranged, in accordance with the hereinbefore set forth principle. Accordingly, each skeg comprises a pair of generally outwardly disposed walls 76, 78. Each of the walls 76 and 78 are defined by a plurality of surfaces 80 and 82, respectively. The surfaces 80 may be angularly disposed with respect to one another, as are the surfaces 82. The specific degree of angularity between the surfaces 80, and between the surfaces 82, may be varied as desired, it being kept in mind only that the skegs 74 must be hydrodynamically designed to facilitate translation of the vessel 22 across the body of water W. The walls 76 and 78 may be structurally operatively associated with one another in any suitable manner, as by means of an end wall 84.

As hereinbefore set forth, each of the hull halves 22 are correspondingly configured with respect to one another. In addition, as also pointed out hereinbefore, each of the hull halves 22 are buoyant portions, in the sense that they are self-supporting on the body of water W. It will now be understood that the portions or hull halves 22 may be pivotably movable or translatable between a plurality of positions with respect to one another.

With particular reference now to FIGURE 8, it will be seen that in one of the plurality of positions, the portions or hull halves 22 are disposed to present or define the enclosure 54, within which any one of the aforesaid materials may be retained or confined. This position, illustrated in FIGURE 8 in full lines, may be denoted as a load carrying or first position. In addition, the portions or hull halves 22 may be pivotally translated to a position in which they are separably disposed in spaced relationship with respect to one another, thus defining an opening therebetween which extends substantialy completely longitudinally thereof, through which the material may be discharged. This position, defining another of the plurality of positions, is illustrated in FIGURE 8 in phantom, and may be denoted as a discharging or second position.

With continued reference to FIGURE 8, and, in addition, with reference to FIGURE 7, it is a principle of the present invention that the portions or hull halves 22 inherently tend to assume the aforesaid first position, namely, the load carrying position, and, under the influence of a load, namely, any one of the stated materials, inherently tends to assume the aforesaid second position, that is, the discharging position. It is considered readily apparent that a body immersed in a fluid experiences a buoyant or lift force equal to the weight of the displaced fluid. This static lift force acts generally vertically through the center of gravity of the displaced volume, and the location on the body corresponding to the center of gravity of the displaced volume of fluid is called the center of buoyancy. If the center of buoyance is aligned with the center of gravity of the object or body immersed in a fluid, then it will be understood that the body will be disposed in a position of equilibrium. However, if the center of gravity of the body or object immersed in the fluid is disposed generally outwardly of the center of buoyancy, then it will further be understood that a turning force or moment will be created about the center of buoyancy. Accordingly, the object or body will tend to move and, more particularly, will tend to rotate.

If each of the portions or hull halves 22 now be considered as a body or object immersed in a fluid, i.e. the body of water W, it will be understood that the center of gravity thereof will be disposed generally outwardly of the center of gravity of the volume of fluid displaced thereby, and, therefore, generally outwardly of the center of buoyancy through which the aforesaid static lift force acts. This is particularly true in view of the configuration and arrangement of the portions or hull halves 22, as hereinbefore set forth. Accordingly, a moment or turning force is introduced which enables each of the portions or hull halves 22 to inherently assume the aforesaid first position, namely the load carrying position. However, if it now be assumed that one of the stated materials is disposed within the enclosure 54, then it will be understood that the center of gravity of one of the portions or hull halves 22, and that portion of the load or materials positioned therewithin, will be positioned nearer the mating wall 52 than the center of gravity of one of the portions or hull halves 22 in and of itself. Accordingly, this center of gravity, namely, the center of gravity of a combination of one hull half 22 and the load material disposed therewithin, will be positioned generally inwardly of the center of gravity of the volume of fluid W displaced thereby. As a result, a turning force or moment will be introduced, inherently tending to translate the portions or hull halves 22 to the second of the aforesaid positions thereof, namely, the discharging position.

In accordance with the above principles, the portions or hull halves 22 may be pivotally, structurally operatively asociated with one another in order to be translated between the aforesaid plurality of positions. To this end, a platform 86 is positioned upon the surface or deck 24 at the bow or leading end 58 and at the stern or trailing end 60 substantially adjacent to the bulwark 56. A plurality of generally triangularly configured plates 88 are positioned upon each of the platforms 86 with each of the plates having an aperture (not shown) extending therethrough. The apertures are disposed in generally horizontal alignment with respect to one another to enable a pivot pin 90, of any suitable construction, to be disposed therewithin and extending completely therethrough. It will be seen, therefore, that there is defined a hinge assembly enabling the portions or hull halves 22 to pivotally translate with respect to one another between the aforesaid plurality of positions.

With particular reference to FIG. 6, it will be seen that the hinge assembly, comprising the platform 86, the plates 88, and the hinge pin 90, further comprises at least one hatch door 92, for a purpose to be described more fully hereinafter. This hatch door is not illustrated in FIGURE 2, in order to facilitate an understanding of the present invention as illustrated in that figure.

The mating walls 52 define, in effect, a generally vertically extending center line of the vehicle or vessel 20. And, in addition, the hinge assembly is positioned along the generally vertically disposed center line thereof. It will now be understood that the facility hereinbefore referred to for enabling the portions or hull halves 22 to inherently tend to assume each one of the aforesaid plurality of positions depends upon the location of the hinge assembly along this generally vertical center line. If the elevation of the hinge assembly relative to the surface or deck 24 is increased, then the natural tendency of the complementary buoyant portions 22 to assume the second of the aforesaid positions denoted as the discharging position will be increased. And, this will be true even in the absence of a substantially decreased load or even a load of minimal proportions. However, it is desirable that the complementary buoyant portions 22 inherently tend to assume only the first or load carrying position in the absence of a load comprising any one of the stated materials. Accordingly, the elevation of the hinge assembly relative to the surface or deck 24 is decreased until the same is disposed substantially adjacent thereto. Keeping this criterion in mind, it is nevertheless to be remembered that the elevation of the hinge assembly relative to the surface or deck 24 can be varied if it is desired to vary the inherent tendency of the portions 22 to assume either one of the aforesaid plurality of positions. If it is desired to vary the elevation of the hinge assembly, then it will be further understood that the inherent tendency to assume at least one of the aforesaid plurality of positions may require the expenditure of some power.

With reference now to FIGURES 2, 3, 4, 5, and 8, it will be noted that the mating walls 52 are disposed in juxtaposition with respect to one another when the complementary buoyant load carrying portions 22 are disposed in the aforesaid first position, namely, the load carrying position. When a load comprising any one of the stated materials is disposed within the enclosure 54, a force is introduced thereby that acts against the load carrying wall 44. This force can be resolved into a plurality of force components, one acting generally perpendicularly with respect to the load carrying wall 44, and the other acting along a plane disposed in spaced parallel relationship relative therewith. If the mating walls 52 were disposed in abutting mutual cooperative engagement with one another, that force component acting against the load carrying wall 44 would tend to bend or deflect it, particularly toward the medial portion of each hull half 22. Accordingly, it can be seen that an opening would result between the hull halves 22, through which the load of the stated material would tend to inadvertently and undesirably discharge.

It is a principal object of the present invention to insure that, when the buoyant load carrying portions 22 are in the aforesaid first or load carrying position, the load disposed therewithin is not discharged until the performance of this result is desired. Accordingly, this invention comprehends the introduction of a pre-loading force at the mating walls 52, and substantially completely longitudinally thereof, enabling the walls 52 to be disposed in a firm abutting mutual cooperative engageable relationship with one another substantially completely along the longitudinal dimensional extent thereof.

Accordingly, a mating bar 94 is structurally operatively associated with or mounted upon each one of the mating walls 52 at a location substantially adjacent to the connection of the frame member 46 to the gusset plate 48. Each of the mating bars 94 define a mating edge 96 which extends substantially completely along the longitudinal dimensional extent thereof. The edges 96 which are disposed in the aforesaid mutually cooperatively engageable relationship with respect to one another, may be of any suitable configuration or contour. It is desirable that the pre-loading force introduced by the mating bars 94 when the edges 96 thereof are disposed in the aforesaid relationship be substantially greater at the center of the vehicle or vessel 20 than adjacent the end portions thereof so that torsional distortion of the portions or hull havles 22 of the vehicle or the vessel 20 due to the load will not cause the vehicle or vessel 20 to open along the central portion. Accordingly, the edges 96 are so contoured and arranged, that, the edges 96 are cambered so as to present a substantially parabolic configuration. This particular configuration is preferred since the pre-loading force introduced by the bars 94 when end portions of the vehicle or the vessel 20 are brought together will be substantially greater along the central portion thereof than adjacent the end portions. More particularly, since portions or hull halves 22 of the vehicle or vessel 20 are clamped together only adjacent the end portions thereof the weight of the load tends to cause the portions or hull halves 22 to twist toward an open position near the longitudinal center portion. By cambering the mating edges 96, the central portions are caused to meet first and as the end portions of the hull halves 22 are drawn closed they are twisted, prestressing the central portion thereof more tightly together so that the twisting force caused by the weight of the load is opposed by a greater force than if the mating edges 96 of the portions or hull halves 22 were not cambered, as disclosed. It will be understood, therefore, that by parabolically contouring or cambering the edge 96 of the bars 94, the pre-loading force introduced thereby will be substantially uniform completely of the longitudinal dimensional extent thereof when the portions or hull halves 22 are disposed in the aforesaid first or load carrying position and the barge is loaded. It is to be further understood that a parabolic curve or configuration is the theoretically perfect curve or condition but that it is difficult, if not impossible, to achieve such curve or configuration in actual practice. It has been found that a suitable approximation may be obtained by a plurality of chordal segments, points of which intersect the true parabola. It is to be still further understood that the expression "generally parabolic contour," as used in the instant disclosure as well as the claims appended hereto is to be interpreted as comprising an approximation of such curve or configuration, that is, a curve, contour or configuration which is more parabolic than, for example, straight.

In accordance with the above construction, it will now be understood that, when the load carrying portions or hull halves 22 are disposed in the aforesaid first or load carrying position, a load comprising any one of the stated materials will be precluded from inadvertent or undesirable discharge therefrom until the preformance of this function is desired. This is particularly true since it is at the ends 58 and 60 of the vehicle or the vessel 20 that the portions or hull halves 22 are brought together, in a manner to be described more fully hereinafter, and the mating walls 52, which are fabricated as a plane surface, are actually twisted under the influence of the pre-loading force, generally medially of the longitudinal dimensional extent thereof, at which location the transverse dimensional extent or width of the bars 94 is a maximum. Of course, the enclosure 54 is presented that is completely clear and unobstructed.

With respect now to the ends 58 and 60 of the vehicle or the vessel 20, it is not necessary that the portion of the mating walls 52 extending outwardly from the bulwark 56, and from the surface or deck 24 to the bottom wall 40 be disposed in an abutting mutually cooperatively engageable relationship with respect to one another. Accordingly, this portion of the mating walls 52 is fabricated of a tapered configuration, enabling them to diverge from a location corresponding generally with the terminal points of the mating bars 94, at which location the walls 52 may be disposed in the aforesaid relationship, because of the provision of the bars 94 to the terminus of the ends 58 and 60. At the latter location, the walls 52 define a space 98, which may be of the order of one inch. This dimension will increase as the portions or hull halves 22 pivotally translate to the aforesaid other position, namely the second or discharging position, about the hinge pin 90 of the hereinbefore described hinge assembly. It will now be understood that the gratings 30 may extend traversely relative to the space 98, so that a walkway is presented from one portion to another. Accordingly, the gratings 30 will be so constructed and arranged as to be relatively movable with respect to the surface or deck 24 of at least one of the portions or hull halves 22.

In accordance with the above construction, the mating bars 94 may be disposed in horizontal alignment with respect to one another, so that they may be disposed in the aforesaid relationship. It is, however, within the ambit of the present invention to dispose the mating bars 94 in vertical alignment with respect to one another, that is, to dispose one of the bars 94 in underlying relationship with respect to the other one thereof. The bars 94 are still cambered or contoured as hereinbefore set forth, so that the cambered mating edges 96 are still presented. However, one of the mating edges 96 will be disposed in abutting mutual cooperative engagement with one of the mating walls 52, and the other mating edge disposed in a similar relationship with respect to the other mating wall. A substantially uniform pre-loading force will still be introduced completely of the longitudinal dimensional extent of that portion of the mating wall 52 corresponding with the same dimension of the mating bars 94, when the portions or hull halves 22 are disposed in the aforesaid first or load carrying position. However, a very tortuous discharge path is now defined from the enclosure 54, enabling a substantially absolute preclusion of inadvertent or undesirable discharge of a load comprising any one of the stated materials from the enclosure 54. This is particularly true when the load comprises a material having characteristics approaching that of a fluid.

It has hereinbefore been emphasized that the portions or hull halves 22 inherently intend to assume the aforesaid first or load carrying position where there is no load disposed within the enclosure 54. And, when a load comprising any one of the stated materials is disposed within the enclosure 54, then the portions or hull halves 22 inherently tend to assume the aforesaid second position, namely, a discharging position. It is within the concept of this invention to control the rate of translation of the portions or hull halves 22 between the first and the second positions. And, it is within the scope of the invention to assist translating the portions or hull halves 22 from one of the positions to another, and to maintain them in a selected intermediate position until the desired operation to be performed is completed. For example, when a load is to be discharged and, under its influence, the portions 22 are translated to the second or discharging position, the aforesaid opening moment decreases as the discharge opening between the portions increases. Moreover, once the portions 22 have reached the second or discharging position, it is desired that they be maintained thereat until the load is completely discharged. Conversely, as the portions approach the first or load carrying position, the aforesaid closing moment decreases, and it is desirable that they be assisted in reaching this first position. In addition, once the mating edges 96 of the bars 94 contact one another, particularly generally medially of the longitudinal dimensional extent thereof, it is necessary that a force be introduced at the ends thereof to dispose the mating bars in the aforesaid abutting mutual cooperative engageable relationship completely along the length thereof, so as to, in turn, introduce the uniform pre-loading force hereinbefore described.

To this end, and with particular reference now to FIGURE 8, each portion or hull half 22 comprises, still further, a housing 100 positioned at each of the bow or leading and stern or trailing ends 58 and 60, respectively, in juxtaposition in respect to the enclosure 54, and in substantially underlying relationship with respect to the platform 86 of the hinge assembly. Each housing 100 comprises a roof or upper wall 102, that may be mounted upon the surface or deck 24, and in underlying relationship with respect to the platform 86. In addition, the housings 100 comprise a side wall 104, and an end wall 106. The end walls 106 are disposed generally in vertical alignment with the mating walls 52 and, it will be understood, may be disposed in spaced parallel relationship with respect to one another when the portions or the hull halves 22 are disposed in their aforesaid first or load carrying position. Each of the housings 100 are stabilized or rigidified by means of generally horizontally extending braces or struts 108, which struts are placed in spaced parallel relationship with respect to one another, and with respect to the roof or roof wall 102. It will now be understood, that, as the portions 22 are translated to the second or discharging position the housings 100 are translated therewith and become separably disposed with respect to one another. With reference again to the platform 86, the same comprises a plurality of platform portions 110 and 112, each portion having and being separated by an end wall 114. Accordingly, and in like manner with respect to the housings 100, the platform portions 110 and 112 may be translated with the hull halves 22, and separably disposed with respect to one another when the hull halves 22 are disposed in the second or discharging position.

A hydraulic assembly 116 is positioned within the housings 100 at each of the bow or leading end 58 and the stern or trailing end 60 of the vessel or vehicle 20. The hydraulic assemblies 116 may be of any suitable construction and arrangement in order to control the rate of translation of the portions or hull halves 22 between the aforesaid positions, to assist them in reaching either one of the positions, and to maintain them thereat or intermediate thereof until the desired function is completely performed.

For example, the hydraulic assembly 116 may take the form of a double-acting motor comprising a cylinder 118, and a piston-rod arrangement 120 longitudinally reciprocally movably disposed within the cylinder 118. A mounting plate 122 may be fixedly positioned upon the side wall 104 of one of the housings 100, and the cylinder 118 pivotally structurally operatively associated therewith, as by means of a pivot pin 124. Similarly, a mounting plate 126 is fixedly positioned upon the side wall 104 of the other housing 100, and the piston and piston-rod arrangement 120 pivotally structurally operatively associated therewith, as by means of a pivot-pin 128. The amount or degree of translation of the portions 22 to the second or discharging position will be proportionate to the stroke or length of travel of the piston of the arrangement 120 within the cylinder 118. Therefore, the area of the discharge opening defined between the portions or hull halves 22 when disposed in the second or discharging position will also be proportionate to the stroke of the hydraulic assembly 116. The dimensional extent of the hydraulic assembly 116 will thus be chosen accordingly. It will be understood, however, that the hydraulic assembly 116 may be chosen as having a stroke corresponding with the maximum discharge opening between the portions 22, since, it is within the ambit of the present invention, to vary the area of the discharge opening by terminating the travel of the piston-rod arrangement 120 within the cylinder 118 before it reaches the end of its stroke, as will be described hereinafter. A cover 130 is positioned upon the cylinder 118 of the hydraulic assembly 116 to preclude the load as it is discharged from within the enclosure 54, from fouling or in any other way deleteriously affecting the smooth, positive and controlled operation of the hydraulic assembly 116.

As pointed out hereinbefore, it is necessary to introduce a force, which may be denoted as a closing force, at the end of the mating bars 92 in order to dispose them in the aforesaid abutting mutual cooperative engageable relationship with respect to one another, completely along the length thereof and, in turn, introduce the aforesaid pre-loading force thereto. This force is preferably provided by the hydraulic assembly 116 as actuated and controlled by the hydraulic circuits and auxiliary apparatus carried by the vehicle or the vessel 20 and shown in FIGURE 14 and more fully and completely described below.

It may, under certain types of operating circumstances, be desirable to provide a mechanical type of locking or latching apparatus 132 to supplement the hydraulic assembly 116 and to retain the portions or hull halves 22 in the first or load carrying position. The apparatus 132 would allow the hydraulic pressure in the hydraulic assembly 116 to be relieved if the vehicle or the vessel 20 is to remain loaded, for instances, for a substantial length of time or to provide a safety mechanism to maintain the portions or hull halves 22 in the load carrying or first position if the hydraulic assembly 116 fails while the vehicle or the vessel 20 is loaded. In practice, however, it has been found that the locking or latching apparatus 132 is unnecessary during normal type operations.

Referring now to FIGURE 9, one simple form of the locking or latching apparatus 132 is illustrated which may serve the above latching and safety functions. A hinge pad 134 is fixedly positioned upon the bottom wall 40 of one of the portions or hull halves 22 and within the housing 100 corresponding thereto, with the pad 134 having a generally triangularly configured upper end 136, at the apex of which an arm or clasp 138 is pivotally structurally operatively associated, as by means of a pivot pin 140. A lug pad 142 is fixedly positioned upon the bottom wall 40 of the other portion or hull half 22, and within the housing 100 corresponding thereto. The lug pad 142 is so configured and arranged as to present a lug 144 extending therefrom to cooperate with the clasp 138 in such a manner as to prevent pivotal movement of the portions or hull halves 22 relative to one another when the clasp 138 is positioned in the latching position, as shown in solid lines in FIGURE 9, and to permit relative pivotal movement of the portions or hull halves 22 relative to one another when the clasp 138 is pivoted about the pivot pin 140 to a non-engaging position, as shown in phantom lines in FIGURE 9.

A handle 146 is pivoted at one end thereof to the clasp 138 by means of a pivot pin 148 to provide an actuating means for positioning the clasp 138 selectively in either the engaging or the non-engagin position. The handle 146 is provided at the other end thereof with a plurailty of apertures 150 and 152 to be selectively associated with a bracket 154 fixedly positioned upon the roof wall 102 of one of the housings 100 as by means of a pin 156 which may be provided with a keeper chain 158. When it is desired to engage the clasp 138 with the lug pad 142 to lock the portions or hull halves 22 together, the handle 146 is affixed by means of the pin 156 through the upper aperture 150 of the handle 146 to the bracket 154. When it is desired to move the clasp 138 to the non-engaging position to permit the portions or the hull halves 22 to separate, the pin 156 is withdrawn and the handle 146 is moved to align the aperture 152 with the bracket 154 and the pin 156 reinserted, thereby retaining the clasp 138 in the non-engaging position and allowing the portions or hull halves 22 to move pivotally relative to one another. Access to the handle 146 for selectively positioning it in either one of the two positions may be provided by means of a hatch door 92. Hydraulic or electrical operation of the clasp 138 may be provided to allow remote operation thereof, if desired, rather than the manual operation above described. As hereinbefore mentioned, however, the locking or latching apparatus 132 has been found to normally be unnecessary in practice, the hydraulic assembly 116 being sufficient to maintain the portions or hull halves 22 in the first or load-carrying position. In actual practice, therefore, it has been found advantageous to provide a clearance between the clasp 138 and the lug 144 when in the engaged position to permit easier operation of the locking or latching apparatus 132 when such use is desired. When assembled in this manner, the locking or latching apparatus 132 is still capable of performing the safety function without unduly hindering the normal operation of the vehicle or the vessel 20.

Under still other certain conditions, a more positive locking or latching apparatus may be desired, in order to provide the closing force or to supplement the closing force provided by the hydraulic assembly 116 or to maintain the closing force supplied by the hydraulic assembly 116 after the portions or hull halves 22 have been disposed in the first or load carrying position and to thereby maintain the pre-loading force hereinabove described.

To this end, the hydraulic assembly 116 may be associated with a locking or latching apparatus 200, FIGURE 10, for bringing the mating edges 96 of the mating bars 94 into the aforesaid relationship with respect to one another to introduce the pre-loading force hereinbefore described, and for retaining the portions or hull halves 22 in the first or load carrying position.

With reference now to FIGURE 10, one embodiment of the locking or latching apparatus 200 is illustrated therein. It will first be understood that the locking or latching apparatus 200 illustrated in this figure, and the other embodiments thereof illustrated in FIGURES 11 through 13 hereinafter to be described, are ilustrated in full lines to indicate the position assumed by the component parts thereof when the portions 22 assume the aforesaid first or load carrying position as illustrated in full lines in FIGURE 8, and are illustrated in phantom to indicate the position assumed by the parts thereof when the portions 22 assume the second or discharging position as illustrated in FIGURE 8 in phantom.

The locking or latching apparatus 200 comprises a linkage assembly 202 having a plurality of linking members 204 and 206 that are disposed in pivotal structural operative association with one another generally medially of the combined longitudinal dimensional extent thereof, as by means of a pivot pin 208. One of the plurality of linking members, namely, the linking member 204, is pivotally structurally operatively associated with the roof wall 102 of one of the housings 100, as by means of a bracket 210 fixedly positioned thereupon, and a pivot pin 212.

It is also to be noted that in FIGURE 9 the locking or latching apparatus 132 is illustrated as extending generally downwardly and to the right, as viewed therein, from the bracket 154, while, in FIGURE 10, the locking or latching apparatus 200 is illustrated as extending from the pivot pin 212 generaly downwardly and to the left. Thus, it will be realized that the locking or latching apparatus may be pivotally associated with the roof wall 102 of either one of the housings 100, and extend downwardly along an inclined plane to a location substantially adjacent the mating wall 52 on the other housing when the linkage assembly 202 is disposed in the full line position, which position corresponds with the first or load carrying position of the portions or hull halves 22, as hereinbefore pointed out. The housings 100 themselves are not illustrated in FIGURE 10, or for that matter, in FIGURES 11 through 13, to facilitate an understanding of the construction and arrangement of the locking or latching apparatus, and the manner in which they perform their function. It should also be likewise understood that the clasps 138 as illustrated in FIGURE 9 may be pivotally associated with either one of the portions or hull halves 22.

More particularly, the other of the aforesaid linking members, namely, the linking member 206, comprises a linking arm 209 pivotally, structurally and operatively associated with an end opposite that end thereof at which it is similarly associated with the linking member 204. This may be accomplished in any suitable manner, as by means of a pivot pin 214. The arm 209 comprises a plurality of legs 216 and 218 disposed in generally acute angular relationship with respect to one another. It is to the leg 216 that the other linking member 206 is pivotally associated in the manner aforesaid. The leg 218, which is of greater longitudinal dimensional extent than the leg 216, may be pivotally, structurally and operatively associated with that one of the portions or hull halves 22 corresponding to the housing 100 with which the aforesaid one linking member 204 is similarly pivotally associated. To this end, a mounting block 220 is fixedly positioned upon the bottom wall 40 of one of the portions 22, having a generally triangularly configured upper end 222, at the apex of which the arm 218 is pivotally pivot pin 224.

The arms 216 and 218 define an apex 226, since they are disposed in acute angular relationship with respect to one another, as heretofore pointed out. A toggle link 228, of generally triangular configuration, and presenting an apex 230, may be pivotally structurally operatively associated with the linking arm 209 at the apex 226 thereof, as by means of a pivot pin 232. Another mounting block 234 is fixedly positioned upon the bottom wall 40 of the other portion or hull half 22, and within the housing 100 corresponding thereto. The block 234 is so configured and arranged as to present a groove 236 at one end thereof that defines a camming surface having a configuration that corresponds generally with the peripheral configuration of the toggle link 228. The toggle link 228 may be disposed within the groove 236, when the locking structure 200 is disposed in a position, illustrated in FIGURE 10 in full lines, corresponding to the first or load carrying position of the portions or hull halves 22. In addition, the toggle link 228 coacts or cooperates with the camming surface defined by the groove 236 in such a manner as to provide the aforesaid closing force at the terminal locations of the mating bars 94, as will be described more fully hereinafter.

The locking or latching apparatus 200 comprises, still further, a double-acting hydraulic motor 238 having a cylinder 240 and a piston and piston-rod arrangement 242, the latter of which may be longitudinally reciprocally movably disposed within the former. The cylinder 240 is pivotally structurally operatively associated with the end wall 106 of that one of the housings 100 with which the linking member 204 is similarly associated, as by means of a pivot pin 244. The piston and piston rod arrangement 242, in turn, is pivotally associated with the linking members 204 and 206 at the point of juncture by means of the pivot pin 208. Once again, with regard to the linking member 204, a contact lever 246 is non-rotatably structurally operatively associated therewith by means of the pin 212. The lever 246 may mutually cooperatively engage the contact pin 248 of a lock signal limit switch 250, of any suitable construction, for purposes to be described more fully hereinafter, as the locking or latching apparatus 200 is translated to the position thereof, illustrated in phantom in FIGURE 9, corresponding to the second or discharging position of the portions or hull halves 22.

It is to be noted that the toggle link 228, and the camming surface of the groove 236 are so configured and arranged as to provide a maximum retaining force when the latching or locking apparatus is disposed in the first or load retaining position. At the same time, the toggle link 228, and the camming surface of the groove 236 are so configured and arranged as to present a rapid decrease in the force required to disengage the link 228 therefrom. Thus, it will be seen that the toggle link 228 is generally horizonatlly disposed in firm abutting mutual cooperative engagement with the camming surface defined by the groove 236 when the linkage assembly 202 is disposed in the retaining position. During the initial portion of the travel of the linkage assembly 202 to the releasing position, toggle link 228 will tend to pivotally move in a generally clockwise direction from the horizontal to the vertical. It is during this portion of the travel of the linkage assembly 202 that a maximum releasing force is required, since it is during a corresponding portion of the travel of the toggle link 228, as just described, that the apex 230 thereof will be disposed in the aforesaid firm abutting contact with the groove 236. However, the toggle link 228 rapidly approaches the vertical, since the distance from the pin 232 to the groove 236 rapidly increases, inasmuch as the pin 232 is translated along an arc. Once the toggle link 228 does approach the vertical, the degree of contact with the groove 236 is substantially reduced, so that the force required to completely release the linkage assembly 202, comprising the linking arm 206–208, the toggle link 228 and the camming surface defined by the groove 236 of the mounting 234, is, in turn, also substantially reduced. In fact, and for all practical purposes, it may be said that once the toggle link 228 approaches the vertical, the releasing force is reduced substantially to zero. It is emphasized, however, that this substantial reduction in the releasing force occurs during the initial portion of the travel of the linkage assembly 202 from the retaining position to the releasing position.

It will now be seen that a substantial closing force is terminally required to dispose the latching or locking apparatus 200 in the retaining position, enabling the mating bars 94 to be disposed in the aforesaid relationship with respect to one another, to introduce the hereinbefore described pre-loading force. And, it will be seen that a substantial releasing force is initially required to release the linkage assembly 202 of the latching or locking apparatus 200. Accordingly, the portions or hull halves 22 are capable of being retained in the first or load carrying position even though a load of substantial magnitude is disposed within the enclosure 54. While the piston-and-cylinder combination 118, 120 of the hydraulic assembly 116 may be relied upon to assist in retaining the portions or hull halves 22 in the first or load carrying position, leakage or failure therein will be of no effect or concern, since the latching or locking apparatus 200 is capable of maintaining them in that position, even under the influence of the load, as just pointed out. In addition, if the vehicle or vessel 20 is to remain loaded over an extended period of time, the latching or locking apparatus 200 of the hydraulic assembly 116 is capable of performing this function, thus eliminating the need for applying substantial pressures to the piston-cylinder combination 118, 120 over that period of time. Similarly, once the latching or locking apparatus is disposed in the retaining position, there will be no need to apply constant substantial pressures to the hydraulic motor assembly 238. Of course, once it is desired to release the latching or locking apparatus 200 it will be seen that the linkage assembly 134 thereof, as hereinbefore described, is so constructed and arranged as to present a substantial mechanical advantage, enabling the performance of this function with facility. The converse is equally true, namely, the linkage assembly 134 presents a substantial mechanical advantage when it is desired to dispose the latching or locking apparatus 200 in the second or retaining position.

With reference now to FIGURES 11 and 12, wherein like reference characters indicate like parts, another embodiment of a latching or locking apparatus 300 is illustrated. In lieu of the linking arm 209, the toggle link 228 and the groove 236, the latching or locking apparatus 300 comprises a retaining assembly 302, having a bifurcated toggle link 304 and a plurality of legs 306 disposed in pivotal structural operative association with the upper end 308 of a mounting block 310, as by means of a pivot pin 312. An arm 314, integral with the legs 306 is disposed therebetween and extends generally vertically upwardly therefrom, at an acuate angle with respect thereto. The arm 314 may be pivotally structurally operatively associated with the link 206, as by means of a pivot pin 214.

The mounting block 316 comprises a lug 318 disposed at the upper end thereof. The lug 318 defines a beveled surface 320 which may be abuttingly mutually cooperatively engageable with a similarly or correspondingly beveled surface 322 defined by the arm 314 of the toggle link 304. The angle of these surfaces with respect to a vertical plane may be varied as desired. It is to be understood, however, that the angle must be chosen so as to provide the aforesaid substantial closing force, and a substantial force initially required to release the retaining assembly 202 of the latching or blocking apparatus 300, in a manner similar to that hereinbefore described in connection with the latching or locking apparatus 200. Thus, as the surface 322 rides along, or is disposed in the aforesaid abutting relationship with the surface 320, a substantial force will initially be required to release the retaining assembly 302, and to dispose the same in the retaining position. Once these surfaces are no longer disposed in the aforesaid relationship, this force is substantially reduced, and, for all practical purposes, approaches zero. The longitudinal dimensional extent or length of the surface will determine the rate at which the force will be reduced. Accordingly, when the length of the surface is minimal, the terminal closing and the initial releasing force will rapidly increase, and rapidly decrease, respectively. In all other respects, the operation of the latching or locking apparatus 300 is substantially the same as the operation of the latching or locking apparatus 200.

With particular reference now to FIGURE 13, wherein like reference characters indicate like parts, yet another embodiment of a latching or locking apparatus 400 is illustrated. In this embodiment, the force developed by the hydraulic motor assembly 238 is relied upon, in lieu of the mechanical advantage presented by the linkage assembly 202 of the latching or locking apparatus 200 and 300. Accordingly, the link 204 is eliminated, and the cylinder 240 of the assembly 238 disposed in its position. The piston-and-rod arrangement 242 is now structurally operatively associated with the link 206, as by means of the pin 208. Accordingly, the application of pressure fluid to the assembly 238 in a direction to longitudinally reciprocally move the piston-and-rod arrangement 242 into and out of the cylinder 240 will directly translate the arm 218 to the release position, as illustrated in phantom, and to the retaining position, as illustrated in full lines, respectively. The toggle link 228 will operate in the same manner as does the toggle link 228 of the latching or locking apparatus 200.

As heretofore pointed out, in the preferred embodiment of this invention, the hydraulic assembly 116 may be utilized to provide the sole or only closing force necessary to develop and maintain the pre-loading force hereinabove mentioned. To this end, and with reference now to FIGURE 14, a suitable hydraulic circuit or system is illustrated for developing and maintaining the required fluid pressure in the hydraulic assembly 116. In describing this circuit, it will be understood, at the outset, that it is exemplary only.

With continued reference to FIGURE 14, the hydraulic circuit or system comprises a pump 500, of any suitable construction and arrangement, which may be disposed in driven connection with the engine 502 also of any conventional design. In practice, it has been found that a diesel engine is particularly suitable for use in this invention, although a gasoline engine or any electric motor could appropriately be used. It is within the ambit of the present invention, as hereinbefore pointed out, that the hydraulic assembly 116 be operable from a remote location and to this end, a hydraulic control valve 504 may be disposed in operative association with the pump 500. The hydraulic control valve 504 may be of any suitable construbtion, having solenoids 506 and 508 for opening and closing the portions or hull halves 22 of the vehicle or vessel 20, respectively. Additionally, conduit means 510 places the inlet side of the valve 504 in communication with a pump control valve 518 with conduit means 514 and 516 leading from the valve 504 to the cylinder 118 of the hydraulic assembly 116. Conduit means 512 provides communication between the outlet side of the hydraulic control valve 504 and a reservoir.

The pump control valve 518, of any suitable construction, may be disposed in the conduit means 510 between the pump 500 and the hydraulic control valve 504. The pump control valve 518 is effective to charge the pump 500 through a solenoid 520 and discharge same by means of a spring 522. The function of the pump control valve 518 is to unload the pump 500 when the pump 500 is not actually moving the piston rod 120 of the hydraulic assembly 116. Without the pump control valve 518, the fluid flow discharge from the pump 500 would be dumped over a relief valve 523, which may be a separate valve or may be integral with the pump 500, but the pump 500 would be operating at full load without doing any useful work, and this might result in overheating in addition to a waste of energy.

The conduit means 514, as illustrated, is connected to a closing port 524 associated with the open end of the hydraulic assembly 116 through a pilot operated check valve 526. The conduit means 516, as illustrated, is connected to the closing port 524 through a one-way check valve 528 of any suitable construction. A variable restrictor valve 530 and a one way check valve 532 are connected in parallel between the check valves 526–528 and the closing port 524. The conduit means 514 is also directly connected to an opening port 534 in the closed end of the hydraulic assembly 116 and to a pilot port 560 of the pilot operated check valve 526.

In accordance with the hereinbefore set forth principle of operation from a remote location, an electrical control system is shown for operating the hydraulic control valve 504 and the pump control valve 518. This electrical circuit comprises a control switch 536 and connecting electric lines 538. The control switch 536 may be a manually operated switch or may be a radio control switch to permit remote operation from a location spacially separated from the vehicle or the vessel 20. If radio control is provided for the control switch 536, then radio control may also be provided for the engine 502.

One possible embodiment of the pilot operated check valve 526 that may be used in the hydraulic circuit or system as illustrated in FIGURE 14 is shown schematically in FIGURE 15 of the drawing wherein the pilot operated check valve 526 comprises a body 550 having a flow control chamber 552 and a pilot chamber 554 therein. An inlet port 556 and an outlet port 558 are provided within the body 550 to communicate with the flow control chamber 552. A pilot port 560 communicates with the pilot chamber 554. A valve member 562 having a valve head 564 positioned within the flow control chamber 552, and a pilot piston 566 positioned within pilot chamber 554 is positioned within the body 550. The valve head 564 is provided with a conical valving surface 568 which cooperates with a valve seating surface 570 found in the body 550 to preclude fluid flow through the flow control chamber 552. A valve stem 572 connects the pilot piston 566 to the valve head 564 of the valve member 562 and a bias in the form of a spring 574 is operatively associated with the valve member 562 to bias the valve head 564 into a closed position.

Referring now to FIGURE 15A wherein the pilot operated control valve 526 is illustrated as operating as an ordinary or conventional check valve, it may be seen that when fluid pressure is applied through the inlet port 556, in the direction of the arrow, into the flow control chamber 552, the fluid pressure will overcome the biasing effect of the spring 574, allowing the valve head 564 to move away from the valve seating surface 570 and to permit fluid to flow through the flow control chamber 552 from the inlet port 556 to the outlet port 558.

Referring now to FIGURE 15B, it may be seen that when fluid pressure is applied to the outlet port 558, the valve head 564 will be biased thereby towards the valve seating surface 570, causing the pilot operated check valve 526 to close and prevent fluid flow reversely through the flow control chamber 552, that is, from the outlet port 558 to the inlet port 556.

Referring now to FIGURE 15C, it may be seen that if pressurized hydraulic fluid is admitted through the pilot port 560, into the pilot chamber 554, the pilot piston 566 will be moved against the biasing spring 574 which in turn will move the valve head 564 away from the seating surface 570. When fluid pressure is admitted to the pilot port 560, the pilot operated check valve 526 will remain open regardless of the direction of fluid flow through the flow control chamber 552.

The pilot operated check valve 526, therefore, will operate as a conventional check valve permitting the fluid to flow from the inlet port 556 to the outlet port 558 while preventing fluid flow reversely therethrough, that is, from the outlet port 558 back through the inlet port 556 when no pressure is admitted to the pilot chamber 554. When pressurized fluid is admitted to the pilot chamber 554, however, the pilot operated check valve 526 will open and permit the free flow of fluid through the flow control chamber 552 in either direction.

Referring now again to FIGURE 14, the operation of the hydraulic circuit or system will be readily apparent. The engine 502 operating the pump 500 will provide a source of pressurized fluid for the hydraulic circuit or system. If the electric control switch 536 is moved to the "open" position, the solenoid 520 will be actuated. This will switch the spool of the pump control valve 518 towards the right, as seen in FIGURE 14, thereby admitting pressurized fluid to the conduit means 510 of the hydraulic control valve 504. Movement of the control switch 536 to the "open" position will also shift the spool of the hydraulic control valve 504 towards the right, as seen in FIGURE 14. The conduit means 514 will therefore be supplied with the full pump pressure and the conduit means 516 will be dumped to the reservoir, through the conduit means 512. Control pressure from the conduit means 514 will therefore be applied to the pilot port 560 and to the inlet port 556 of the pilot operated check valve 526 and therethrough to the closing port 524 of hydraulic assembly 116. This same control pressure will also be applied to opening port 534 of the hydraulic assembly 116 because of the difference in cross sectional areas of two sides of piston 574, piston rod 120 will move towards the open position. As piston rod 120 moves towards the open position, hydraulic fluid will be forced out through the closing port 524 and through variable restrictor valve 530 which will control the rate of movement since the one way check valve 532 is closed to prevent fluid flow therethrough. As hydraulic pressure is present at the pilot port 560 of the pilot operated check valve 526, the fluid leaving the rod or open end of the hydraulic assembly 116 will flow through the flow control chamber 552 and into the opening port 534 of the hydraulic assembly 116 thereby producing a regenerative action. In a regenerative system, the hydraulic fluid leaving one end of a hydraulic cylinder is readmitted to the other end thereof, and in this instance, as the piston rod arrangement 120 of the hydraulic assembly 116 moves towards the open position, the fluid forced out through the closing port 524 is readmitted through pilot operated check valve 526 into the opening port 534 of the hydraulic assembly 116 and this fluid is supplemented by the hydraulic fluid being pressurized in the conduit means 514 by the pump 500. This supplemental fluid is necessary due to the fact that the cross-sectional area of the rod end of the piston 576 of the hydraulic assembly 116 is smaller, due to the presence of the piston rod arrangement 120 within the cylinder 118, than the cross-sectional area of the opposite end of the piston 576. The volume of fluid displaced by the moving piston 576 from the rod or open end of the cylinder 118 is therefore less than the fluid necessary to be admitted to the opposite end of the cylinder 118 to displace the piston 576. The variable restrictor valve 530 allows the rate of opening of the portions or hull halves 22 due to the movement of the hydraulic assembly 116 to be regulated. The one way check valve 528 prevents the dumping of the fluid displaced out of the closing port 524 into the conduit means 516 and to the reservoir through the hydraulic control valve 504 and the conduit means 512.

As the portions or hull halves 22 have a tendency, as pointed out above, to move towards the open or unloading position when the vehicle or the vessel 20 is loaded, the work required to be done by the hydraulic fluid is at a minimum.

It is to be noted that the movement of the hydraulic assembly 116 towards the open or unloading position may be stopped at any time by merely removing the pump pressure from the pilot port 560 of the pilot operated check valve 526. This could be accomplished either by stopping the engine 502 and the pump 500 or more preferably by moving the control switch 536 to a neutral position, that is, so that neither the close nor the open contact is energized. This will have the effect of releasing the solenoid 520 of the pump control valve 518. The bias or spring 522 will move the spool of the pump control valve 518 to unload the pump 500, and thereby relieving pump fluid pressure from the pilot port 560 of the pilot operated check valve 526.

It will be seen that upon the removal of hydraulic pressure from the pilot port 560 of the pilot operated check valve 526, the pilot operated check valve 526 will function as a conventional check valve preventing the discharge of hydraulic fluid from the closing port 524 of the hydraulic clyinder 118 into the conduit means 514. The one-way check valve 528 will likewise prevent the exhaust of hydraulic fluid from the closing port 524 of the hydraulic cylinder 118 into the conduit means 516. It is therefore seen that regardless of the position of the hydraulic control valve 504, and whichever of the conduit means 514–516 is connected to the conduit means 512 and thereby to the reservoir, the hydraulic assembly 116 will be prevented from moving towards the open position when no hydraulic pressure is applied to the pilot port 560 of the pilot operated check valve 526.

When the control switch 536 is moved to the "close" position, the solenoid 520 thereby moves the pump control valve 518 to the pump charging or loading position, and the solenoid 508 of the hydraulic control valve 504 will be actuated to move the control spool of the hydraulic control valve 504 towards the left, as seen in FIGURE 14, and thereby apply pump pressure to the conduit means 516 while allowing the conduit means 514 to dump to the reservoir through the conduit means 512.

The check valves 528 and 532 will be opened by the pressurized hydraulic fluid in the conduit means 516, thereby admitting pressurized hydraulic fluid into the closing port 524 of the hydraulic cylinder 118, and thereby moving the hydraulic piston rod arrangement 120 towards the close position. The pilot operated check valve 526 will operate as a conventional check valve, preventing the dumping of fluid from the conduit means 516 and the rod or open end of the hydraulic cylinder 118 back into the conduit means 514. The fluid present behind the piston 574 in hydraulic cylinder 118 will be exhausted through the opening port 534 into the conduit means 514, through the hydraulic control valve 504, into the conduit means 512, and back into the reservoir. Since the pilot port 560 of the pilot operated check valve 526 is connected through the conduit means 514 and 512 to the reservoir, no pressure will be present at the pilot port 560, and the pilot operated check valve 526 will operate as a conventional check valve.

When the hydraulic assembly 116 has moved to the fully closed position, and thereby the preloading force is applied to the portions or hull halves 22, the control switch 536 may be opened and the pump 500 stopped. As pointed out above, the hydraulic system or circuit, and particularly the pilot operated check valve 526 and the one-way check valve 528 will maintain the hydraulic assembly 116 in the fully closed position and the portions or hull halves 22 in the fully closed position, without permitting any release of hydraulic pressure from the hydraulic assembly 116.

Furthermore, as pointed out above, the portions or the hull halves 22 when unloaded, have a tendency to move towards the closed position. If no hydraulic pressure is present in the hydraulic control circuit or system, that is, if the pump 500 is not operating, the tendency of the portions or hull halves 22 to move to the closed position may be utilized by itself to effectively close the vehicle or vessel 20. The operation under these circumstances is as follows: if the control switch 536 is moved to the close position with the pump 500 not operating, the solenoid 508 will move the spool of the hydraulic control valve 504 towards the left, as seen in FIGURE 14, and as described above. The tendency of the portions or hull halves 22 to move towards the closed position will apply a closing force to the hydraulic assembly 116, thereby applying a greater hydraulic pressure to the opening port 534 than exists at closing port 524. A portion of the fluid exhausted from the opening port 534 will be permitted to pass through the pilot operated check valve 526 and the check valve 532 into the closing port 524. The excess of fluid will be dumped through the conduit means 514 and 512 into the reservoir. If the fluid flow from the conduit means 514 to the conduit means 512 is interrupted, as by opening the control switch 536, the excess fluid will not be permitted to dump from the hydraulic cylinder 118 and any further movement thereof will cease.

With reference now to the embodiments of the invention illustrated in FIGURES 10 through 13, it is now considered readily apparent that, when it is desired to enable the portioins or hull halves 22 to move to the discharging position, it will be necessary to first release the latching or locking apparatus 200, 300 or 400, respectively, if the latching or locking apparatus 200, 300 or 400 are employed in combination with the hydraulic assembly 116.

In the following description and disclosure, for the sake of brevity, reference will be made solely to the latching or locking apparatus 200, illustrated in FIGURE 10, but it is to be understood that it may also refer to the latching or locking apparatus 300 or 400 of FIGURES 11 and 13, respectively. To this end, and with reference now to FIGURE 16, one embodiment of a hydraulic circuit or system suitable for use with the embodiments of the invention is illustrated in FIGURES 10 through 13, which incorporates the circuit of FIGURE 14, but has in addition, circuitry and controls for actuating the double acting hydraulic motor 238 of the latching or locking apparatus 200 and synchronizing the operation thereof with the operation of the hydraulic assembly 116. Like reference numerals as used in FIGURE 14 are used in FIGURE 16 to indicate like portions of the hydraulic system or circuit.

In addition to the components shown in FIGURE 14, the embodiment of FIGURE 16 further comprises a lock control valve 600, of any suitable construction, having a lock solenoid 602 and an unlock solenoid 604. The lock control valve 600 may be disposed in fluid communication with the conduit means 510 and is so constructed and arranged as to present a plurality of outlet means 606 and 608 which are in fluid communication with the cylinders 240 of the double acting hydraulic motors 238. Each of the limit switches 250 is so positioned and arranged as to be closed when the respective double acting hydraulic motor 238 is fully retracted, that is, in the fully unlocked position. The limit switches 250 are operatively associated with open solenoid 506 so as to prevent actuation of the solenoid 506 if the double acting hydraulic motors 238 are not in the fully unlocked positions. A close signal control switch 612 is likewise operatively associated with the hydraulic assembly 116 and the lock solenoid 602 to prevent operation of the lock solenoid 602 if the hydraulic assembly 116 is not in the fully closed position.

The operation of the hydraulic circuit or system of FIGURE 16 should now be readily apparent. If the portions or hull halves 22 are in the second or unloading position, with the engine 502 running and thereby actuating the hydraulic pump 500 and the control switch 536 is moved to the closed position, the solenoid 508 and the solenoid 520 will be actuated. Actuation of the solenoid 602 will be prevented by the open-close signal control switch 612. The hydraulic assembly 116 will then commence movement towards the closed position as described above. When the hydraulic assembly 116 reaches the fully closed position, the close signal control switch 612 will be operated to thereby operate the solenoid 602 which will move the spool of the lock or latch control valve 600 towards the right, as seen in FIGURE 16. The conduit means 510 will therefore be in fluid communication with the outlet means 606 causing the respective double acting hydraulic motor 238 to move towards the latched or locking position. Once the latching or locking apparatus 200 has been moved to the fully latched position, as pointed out above, no further hydraulic pressure is necessary to retain same in this position. The engine 502 may therefore be shut down and the portions or hull halves 22 will remain locked in the first or load carrying position. When it is desired to move the portions or hull halves 22 towards the second or unloading position, movement of the control switch 536 to the open position will energize the unlock solenoid 604 and the solenoid 520. The solenoid 506 will be prevented from operating by action of the limit switch 250. Actuation of the unlock solenoid 604 will move the spool of the lock or latch control valve 600 towards the left, in FIGURE 16, thereby placing the conduit means 510 in fluid communication with the outlet means 608. The respective double acting hydraulic motor 238 will therefore be moved towards the unlock position and upon attaining a fully unlocked position will close the limit switch 250. This in turn will permit the solenoid 506 to operate which in turn will cause the opening of the hydraulic assembly 116 as hereinabove described.

With reference now to FIGURE 17, an alternate embodiment of a hydraulic circuit or system for actuating and releasing the latching or locking apparatuses 200, 300 and 400 is illustrated.

In describing this circuit, it will be understood, at the outset, that it is exemplary only. And, while a circuit is not illustrated for the piston-and-cylinder combinations 118, 120 of the hydraulic assemblies 116, it will be understood that the use of any suitable circuit may be invoked, which will be structurally operatively associated with the circuit illustrated in which the latching or locking apparatus 200, 300 or 400 is disposed.

With continued reference to FIGURE 17, the circuit comprises a pump 650, of any suitable construction and arrangement, which may be disposed in the engine house 26. It is within the ambit of the present invention, as hereinbefore pointed out, that the hydraulic assemblies 116 be operable from a remote point. To this end, a hydraulic control valve 652 may be disposed in operative association with the pump 650. The valve 652 may be of any suitable construction, having an open solenoid 654, and a close solenoid 656. Additionally, the valve preferably is so constructed and arranged as to present an inlet means 658, from the pump 650, an exhaust means 660, which may be directed to any suitable point, such as a tank shown schematically, and a plurality of outlet means 662 and 664. A one-way check valve 666 of any suitable construction may be disposed in each of the outlet means 62 and 664.

The pump 650 may be used to supply pressure fluid to the hydraulic motor assembly 238 of the latching or locking apparatus 200 and to an accumulator section 668 of a hydraulic circuit to the combinations 118, 120 of the hydraulic assemblies 116 (not shown, as heretofore pointed out). The latter hydraulic circuit may have a hydraulic control valve (not shown) that controls the application of pressure fluid from the accumulator section 668 to and from the combinations 118, 120 of the hydraulic assemblies 116. The operation of this control valve, in turn, may be controlled by a hydraulic control valve 670, disposed in the hydraulic circuit illustrated in FIGURE 17. The control valve 670 may be of any suitable construction, and, in accordance with the hereinbefore set forth principle of operation from a remote point, preferably comprises an open solenoid 672, and close solenoid 674. Additionally, the control valve 670 is so constructed and arranged as to supply pressure fluid from the pump 650 to the control valve (not shown) that controls the application of pressure fluid from the accumulator section 668 to the combinations 118, 120, by means of an outlet means 676, 678, and, to exhaust the pressure fluid therefrom, as by an exhaust means 680, which may be directed to the same location as the exhaust means 660 of the control valve 652.

When it is desired to release the latching or locking apparatus 200, the open solenoid 654 of the control valve 652 is operated, in any suitable manner, as, for example, by means of a button control disposed at a remote point (not shown). The inlet 658 will now be connected with the outlet 662, enabling the pump 650 to supply pressure fluid to the accumulator section 668, and simultaneously to that side of the motors 238 enabling them to translate the latching or locking apparatus 200 to the released position, as by means of a passage 682. Fluid pressure from the other side of the motors 238 will now be communicated to the outlet means 664 and the exhaust means 660, which are disposed in communication with one another, as by means of a passage 684, having a one-way check valve 686 of any suitable construction, disposed therewithin. Pressure fluid from the pump 650 is also communicated, at this time, to the control valve 670, as by means of a passage 688, but is precluded from flowing to the outlet 676 since the valve is disposed in a position to preclude such flow.

The operation of the latching or locking apparatus 200, as well as the latching or locking apparatuses 300 and 400, is considered readily apparent from the hereinbefore set forth description thereof. As the linkage assembly 202 nears the termination of the travel to the released position, illustrated in phantom in FIGURE 10, the contact link 246 which is nonrotatably associated with the link 204, approaches the contact pin 248 of the switch 250. Each of the switches 250, as illustrated in FIGURE 17, may be disposed in a circuit that is operably associated with the solenoid 672 of the hydraulic control valve 670. When the contact pins 248 are moved to the dotted line position thereof illustrated in that figure, a circuit is completed to the solenoid 672 for the energization thereof, from any suitable source 690. The hydraulic control valve 670 will now be moved to a position providing communication from the passage 688 to the outlet 676 which, in turn, operates the hydraulic control valve (not shown) that controls the application of pressure fluid to the combinations 118, 120 from the accumulator section 668.

The latching or locking apparatus 200, 300 or 400, having now been released, and pressure fluids supplied to the hydraulic assemblies 116 from the accumulator section 668, it should be understood that the portions or hull halves 22 inherently tend to assume the second or discharging position under the influence of the load disposed within the enclosure 54. As hereinbefore pointed out, the hydraulic assemblies 116 control the rate of translation of the portions or hull halves 22 to the second position of discharge. At the same time, as also hereinbefore pointed out, the translation of the portions or hull halves 22 to the discharging position may be terminated at any desired point to vary the area of the discharge opening defined thereby and therebetween. This may be accomplished in any suitable manner, for example, an over-ride control may be provided at the aforesaid remote point for breaking the circuit in which the solenoid 672 is disposed.

When it is desired to enable the portions or hull halves 22 to inherently return to the first or load carrying position, it is merely necessary to operate the solenoid 674 of the control valve 670. This may be accomplished in any suitable manner, as by providing a button control therefor at the aforesaid remote point. Pressure fluid previously supplied to the hydraulic assemblies 116 from the accumulator section 668 will now be exhausted by the exhaust means 680. Alternatively, the circuit in which the accumulator section 668 is disposed, may be a regenerative circuit enabling pressure fluid to be circulated to the other side of the hydraulic assemblies 116, as well as enabling additional pressure fluid to be supplied to the other side from the accumulator section 668, rather than exhausting fluid by the exhaust means 680. At the same time, the solenoid 656 of the control valve 652 is operated, as from the aforesaid remote point, to provide communication between the inlet means 658 and the outlet means 664, and to provide communication between the outlet means 662, and the exhaust means 660. The flow of pressure fluid will now take place through the one-way check valve 666 disposed in the line 664 to the accumulator section 668, to maintain the pressure therein. At the same time, pressure fluid will be communicated by means of the passage 684 to a sequence valve 692, which may be of any suitable construction, and is particularly adapted to be operable to an open position from a normally closed position when the pressure in the accumulator section 668 reaches a predetermined volume. To this end, a reference pressure line 694 is disposed between the section 668 and the sequence valve 692. As the portions or hull halves 22 are translated to the first or load carrying position, the rate of which may be controlled by the hydraulic assemblies 116, as hereinbefore described, the pressure in the accumulator section 668 will increase. When the mating edges 96 of the mating bars 94 contact one another, the pressure in the accumulator section 668 and, therefore, the reference line 694, will reach a value corresponding with the pressure at which the sequence valve 692 is set. Upon the operation of the sequence valve 692, pressure fluid from the line 664 is communicated to the other side of the motor assemblies 238, and particularly to that side thereof tending to translate the latching or locking apparatuses 200, 300, 400 to the retaining positions. Pressure fluid previously communicated to the other side of the motor assembly 238 will be exhausted by means of the passage 682, the outlet means 662 and the exhaust means 660. It is considered readily apparent that pressure fluid from the accumulator section 668 cannot exhaust by the outlet means 662, in view of the provision of the one-way check valve 666.

It will now be understood that the pump 650, which may be rendered operable in any suitable manner, as by means of a diesel engine disposed within the engine house 26, need not be in constant operation. Thus, an external power source, such as the aforesaid diesel engine, need not be in constant operation either. With regard to the hydraulic circuit illustrated in FIGURE 17, the pump 650 is rendered operable only during the translation of the portions or hull halves 22 to one or the other of the first or second positions. This is particularly true since the accumulator section 668 can be so designed and arranged as to provide sufficient pressure fluid to retain the portions in either one of the positions once the desired position has been reached. And, when the circuit in which the accumulator section 668 is disposed is a regenerative type of circuit that uses its own pressure fluid, it is only necessary to render the pump operable when the accumulator section 668 is being charged with pressure fluid. This may even be accomplished when the vehicle or vessel 20 is being loaded. Once sufficient pressure fluid has been introduced therewithin, the pump 650 may be rendered inoperable, and only the hydraulic control valves 652 and 676 operated to provide the proper direction of fluid flow. In this connection, it is noted that both the hydraulic circuit in which the accumulator section 668 is disposed, and the circuit in which the latching or locking apparatuses 200, 300, 400 are disposed will be supplied with fluid from the accumulator section 668.

The above construction comprehends the use of a limit switch, namely, the switches 250, only when the latching or locking apparatuses 200, 300, 400 are translated to their released position. The hydraulic circuit in which these structures are disposed relies upon the building up of pressure in the accumulator section 668 when the portions or hull halves 22 have returned to the first or load carrying position, and the mating edges 96 of the mating bars 94 are brought into contact with one another. It will now be understood that pressure may be increased due to other causes, which may prematurely cause the sequence valve 692 to be rendered operational, as when some object is disposed between the mating walls 52.

Accordingly, it is within the present invention that a limit switch (not shown), such as the switch 250, be disposed in structural operative association with the hydraulic assemblies 116. These switches will be so constructed and arranged as to be rendered operable only when the aforesaid hydraulic assemblies 116 reach the end of the stroke in a direction corresponding to the direction along which the portions or hull halves 22 are translated as they return to the first or load carrying position.

It should now be understood that, once the latching or locking apparatus 200, 300, 400 are released, overcoming the aforesaid uniform pre-loading force, the combinations 118, 120 of the hydraulic assemblies 116 will control the rate of translation of the portions or hull halves 22 as they inherently tend to assume the second or discharging position under the influence of the load. Thus, the translation of the portions or hull halves 22 will be smooth, controlled and positive under substantially any and all conditions. This may be accomplished in any suitable manner, as by disposing a flow control valve (not shown) in the hydraulic circuit in which the accumulator section 668 and the hydraulic assemblies 116 are disposed. The same is true when the portions or hull halves 22 inherently translate themselves to the first or load carrying position once the load is discharged.

Moreover, it will be understood that the travel of the portions or hull halves 22 to the second or discharging position, for example, may be terminated before the extreme limit thereof is reached, as by means of the aforesaid flow control valve (not shown). Accordingly, the area of a discharge opening defined by and between the portions or hull halves 22 may be varied as desired, as when it is desired to line such as a harbor bottom, or otherwise discharge the load over a substantial area.

Certain directional terminology has been used in the above description, such as "length," "width," and the like. This terminology has been used only to facilitate an understanding of the present invention. Accordingly, it is intended in its normal and accepted sense, and is not in any way to be considered as limiting. Therefore, if and when such terminology is used in the ensuing claims, the broadest possible interpretation is to be attributed thereto.

While the invention has been shown, illustrated, described and disclosed in terms of certain embodiments or modifications which it has assumed in practice, the scope of the invention should not be deemed to be limited by the precise embodiments or modifications herein shown, illustrated, described and disclosed, such other embodiments or modifications intended to be reserved especially as they fall within the scope of the claims here appended.

We claim as our invention:

1. A vehicle comprising
a plurality of load carrying portions;
hinge means pivotally interconnecting the portions for movement from a load carrying position in which the portions abut to a load discharging position in which the portions are spaced apart to discharge material therebetween;
the load carrying portions having edges configured to abut intermediate the longitudinal ends thereof prior to abutting at the ends thereof; and
apparatus for forcing the portions together to preload the abutting edges throughout substantially their entire length for precluding material loss from between the edges.

2. The vehicle of claim 1 wherein the edges are generally parabolic contour.

3. The vehicle of claim 1 wherein the edges are nonlinear.

4. The vehicle of claim 1 wherein the edges are curvilinear.

5. The vehicle of claim 1 wherein the edges are cambered.

6. A vehicle comprising:
a plurality of load carrying portions;
hinge means interconnecting the load carrying portions for pivotal movement from a load carrying position in which the portions define a load carrying enclosure to a load discharging position in which the portions are spaced apart to discharge material therebetween;
at least one of the load carrying portions having an edge configured to abut the other of the load carrying portions intermediate the longitudinal ends of the edge prior to abutting at the ends thereof; and
apparatus for forcing the portions together to preload the abutting edge throughout substantially the entire length thereof for precluding material loss from between the portions.

7. The vehicle of claim 6 wherein the at least one edge is of generally parabolic configuration.

8. The vehicle of claim 6 wherein the at least one edge is of nonlinear configuration.

9. The vehicle of claim 6 wherein the at least one edge is of curvilinear configuration.

10. The vehicle of claim 6 wherein the at least one edge is cambered.

11. Apparatus comprising
a plurality of load carrying portions;
means mounting the portions for relative movement between a load carrying position in which the portions define at least part of a load carrying enclosure to a load discharging position in which the portions are spaced apart to discharge material therebetween;
at least one of the load carrying portions having an edge configured to abut another of the load carrying portions intermediate the longitudinal ends of the edge prior to abutting at the ends thereof; and structure for forcing the portions together to preload the abutting edge throughout substantially the entire length thereof for precluding material loss from between the portions.

12. The apparatus of claim 11 wherein the at least one edge is of generally parabolic configuration.

13. The apparatus of claim 11 wherein the at least one edge is of nonlinear configuration.

14. The apparatus of claim 11 wherein the at least one edge is of curvilinear configuration.

15. The apparatus of claim 11 wherein the at least one edge is cambered.

16. The apparatus of claim 11 wherein the another load carrying portions provides an edge configured to abut the one load carrying portion intermediate the ends of the edge of the another load carrying portion prior to abutting at the ends thereof.

17. The apparatus of claim 16 wherein the edges abut one another.

18. A vehicle comprising
a plurality of load carrying portions;
hinge means pivotally interconnecting the portions for movement from a load carrying position in which the portions define at least part of a load carrying enclosure to a load discharging position in which the portions are spaced apart to discharge material therebetween;
fluid means for enabling the load carrying portions to be moved between the load carrying position and the load discharging position, the fluid means comprising:
   extensible fluid motor structure interconnecting the portions, the motor having a first connection for receiving fluid to retract the motor and a second connection for receiving fluid to extend the motor;
   a source of pressurized fluid;
   conduit means placing the fluid source in communication with both ends of the fluid motor;
   first valve means in the conduit means for selectively extending or retracting the fluid motor;
   the conduit means comprising:
      first pasageway means leading from the first valve means to the first connection of the fluid motor;
      second passageway means leading from the first valve means to the second connection of the fluid motor;
   a first check valve in the first passageway means allowing fluid flow toward the fluid motor and precluding reverse flow therefrom;
   a second check valve means interconnecting the second passageway and the first passageway between the first check valve and the first connection of the fluid motor, the second check valve means normally allowing fluid flow from the second passageway to the first passageway and precluding reverse flow; and
means operable upon the delivery of pressurized fluid through the second passageway for opening the second check valve means to allow fluid flow from the first passageway to the second pasageway.

19. The vehicle of claim 18 further comprising
restriction means in the first passageway means between the first connection and the second check valve means; and
check valve means in the first passageway means in parallel with the restriction means for allowing fluid flow toward the first connection and preventing reverse flow therefrom.

20. The vehicle of claim 18 wherein
the last mentioned means comprises
   pressure actuated pilot structure connected between the second passageway means and the second check valve means.

21. The vehicle of claim 18 wherein
the last mentioned means comprises
   a body having a chamber therein communicating with the second passageway;
   a piston in the chamber;
   a stem connecting the piston to the second check valve means; and
   means biasing the stem against fluid from the second passageway means for closing the second check valve means.

22. A hydraulic system for enabling load carrying portions of a vehicle to be translated between a plurality of positions and for assisting in the retention of such load carrying portions at a selected one of such plurality of positions comprising, in combination:
a pump for supplying a flow of pressurized hydraulic fluid;
a hydraulic control valve having an inlet and a pair of outlets, said valve inlet being selectively connectable to each of said outlets;
conduit means between said pump and said hydraulic control valve to direct said flow of pressurized hydraulic fluid from said pump to said inlet of said hydraulic control valve;
a piston-and-cylinder combination operatively structurally associated with the load carrying portions, said piston-and-cylinder combination having an opening port and a closing port to enable the alternate introduction of said flow of pressurized hydraulic fluid to each one of a plurality of sides of the piston thereof;
a pair of conduits between said hydraulic control valve and said piston-and-cylinder combination, one of said conduits being connected between one of said pair of outlets of said hydraulic control valve and said opening port, the other of said conduits being connected between the other of said pair of outlets and said closing port to enable said hydraulic control valve to selectively direct said flow of pressurized hydraulic fluid to one of said opening port and said closing port; and
check valving operatively associated with said piston-and-cylinder combination to prevent relative movement between said piston and said cylinder of said piston-and-cylinder combination in the absence of a flow of pressurized fluid thereto, said check valving comprising
   a first check valve in said other of said pair of conduits for allowing flow toward said closing port and precluding reverse flow therefrom; and
   a pilot operated second check valve having an inlet port, an outlet port, and a pilot port; said inlet port and said pilot port being in fluid communication with said one of said pair of conduits and said outlet port being in constant fluid communication with said closing port.

23. A hydraulic system as defined in claim 22 further comprising:
a variable restrictor valve in one of said conduits between said check valves and said piston-and-cylinder combination to control the rate of flow of the pressurized hydraulic fluid to enable the rate of translation of the portions to be controlled.

24. A locking device structurally operatively associated with a plurality of complementary load carrying portions for retaining said portions in a load carrying position and for enabling a rapid release of said portions from the aforesaid load carrying position comprising, in combination:
a linkage assembly pivotally disposed for movement between a plurality of positions, one of said positions defining a retaining position, and another of said positions defining a releasing position;
a hydraulic motor assembly structurally operatively associated with said linkage assembly, said motor assembly comprising:

a piston so constructed and arranged as to enable the alternate introduction of a pressure fluid to each one of a plurality of sides of said piston, enabling said motor assembly to move said linkage assembly between the aforesaid positions thereof; and a retaining assembly for retaining said portion in load carrying position;

said retaining assembly comprises:

a toggle link pivotally structurally operatively associated with said linkage assembly;

said toggle link being pivotally movable between a plurality of positions, one of said positions corresponding to the aforesaid retaining position, in which said toggle link assumes a generally horizontal disposition with another of said positions corresponding to the aforesaid releasing position, in which said toggle link assumes a generally vertical disposition; and a camming surface;

said toggle link being abuttingly mutually cooperatively engageable with said camming surface only during the initial portion of the travel of said linkage assembly as it is moved to said releasing position, and only during the terminal portion of the travel of said linkage assembly as it is translated to said retaining position;

said camming surface and said toggle link being so contoured and arranged as to enable the link to assume the vertical during the initial portion of the travel of said linkage assembly to the aforesaid releasing position and to enable the link to be moved from the vertical to the horizontal during the terminal portion of the travel of the linkage assembly to the aforesaid retaining position;

said linkage assembly being so constructed and arranged as to enable the introduction of a substantial mechanical advantage.

25. A locking device structurally operatively associated with a plurality of complementary load carrying portions for retaining said portions in a load carrying position and for enabling a rapid release of said portions from the aforesaid load carrying position comprising, in combination:

a linkage assembly pivotally disposed for movement between a plurality of positions, one of said positions defining a retaining position, and another of said positions defining a releasing position;

a hydraulic motor assembly structurally operatively associated with said linkage assembly, said motor assembly comprising:

a piston so constructed and arranged as to enable the alternate introduction of a pressure fluid to each one of a plurality of sides of said piston, enabling said motor assembly to move said linkage assembly between the aforesaid positions thereof; and a retaining assembly for retaining said portion in a load carrying position;

said retaining assembly comprises:

a bifurcated link pivotally structurally operatively associated with said linkage assembly having:

a beveled surface defining an angle with the vertical; and a mounting block having:

a beveled surface adjacent one end portion thereof defining an angle with the vertical complementary with the angle defined by the beveled surface of said link;

the beveled surface of said link being abuttingly mutually coperatively engageable with the beveled surface cf said mounting block only during the initial portion of the travel of said linkage assembly as it is moved to said releasing position, and only during the terminal portion of the travel of said linkage assembly as it is moved to said retaining position;

said linkage assembly being so constructed and arranged as to enable the introduction of a substantial mechanical advantage.

26. Locking structure for being structurally operatively associated with a plurality of complementary buoyant load carrying portions for retaining said portions in a load carrying position, even under the influence of a load of substantial magnitude, and even in the absence of any other retaining force, and for enabling a rapid release of said portions from the aforesaid load carrying position, comprising, in combination:

a retaining assembly for introducing a substantial closing force to retain said portions in a load carrying position, and requiring a substantial releasing force to release said portions therefrom;

said retaining assembly being pivotally moved between a plurality of positions, one of said positions defining a retaining position, and another of said positions defining a releasing position;

said retaining assembly being so constructed and arranged as to require the aforesaid releasing force only during the initial portion of the travel thereof to said releasing position, and to introduce the aforesaid closing force only during the terminal portion of its travel to said retaining position, and comprising:

a toggle link;

said toggle link being pivotally moved between a plurality of positions, one of said positions corresponding to the aforesaid retaining position, in which said toggle link assumes a substantially horizontal disposition, and another of said positions corresponding to the aforesaid releasing position, in which said toggle link assumes a substantially vertical disposition;

a camming surface;

said toggle link being abuttingly mutually cooperatively engageable with said camming surface only during the initial portion of the travel of said retaining assembly as it is moved to said releasing position, and only during the terminal portion of travel as it is moved to said retaining position, to enable the introduction of the aforesaid closing and releasing force;

said camming surface and said toggle link being so contoured and arranged as to enable the links to assume the vertical during the initial portion of the travel of said retaining assembly to the aforesaid releasing position, further enabling a rapid decrease in the required aforesaid releasing force, and to enable the link to be moved from the vertical to the horizontal during the terminal portion of the travel of the retaiiing assembly to the aforesaid retaining position, further enabling a rapid increase in the required aforesaid closing force; and a hydraulic motor assembly pivotally structurally operatively associated with said retaining assembly for enabling said motor assembly to pivotally move said retaining assembly alternately between the aforesaid plurality of positions thereof.

27. A vessel particularly adapted to be used on a body of water for moving a load comprising any one of a substantial plurality of widely divergent materials between a plurality of locations, and for discharging said load at any selected one of said locations comprising, in combination:
- a plurality of complementary buoyant load carrying portions pivotally structurally operatively associated with one another;
- said load carrying force being so constructed, configured and arranged as to inherently tend to assume one of a plurality of positions in the absence of a load, and to inherently tend to assume another of said plurality of positions under the influence of a load;
- hydraulic assemblies structurally operatively associated with each of said portions for controlling the rate of movement thereof between each of the aforesaid plurality of positions, and for assisting in the retention of said portions at each of said positions, said hydraulic assemblies comprising:
    - locking structure structurally operatively associated with said load carrying portions for retaining said portions in the aforesaid one of said plurality of positions thereof;
    - said locking structure being so constructed and arranged as to be movable between a plurality of positions, one of said positions defining a retaining position corresponding to the aforesaid one position of said portions, and another of said positions defining a releasing position corresponding to the aforesaid other position of said portions;
    - said locking structure further being so constructed and arranged as to enable the introduction of a substantial closing force for bringing the load carrying portions into the aforesaid one position, and requiring a substantial releasing force to release the portions therefrom for enabling said locking structure to maintain and retain said load carrying portions in the aforesaid one position under substantially any and all conditions, and even under the influence of a load of substantial magnitude;
    - said locking structure comprises;
    - a linkage assembly that is so constructed and arranged as to be pivotally movable between the aforesaid retaining and releasing positions;
    - a hydraulic motor assembly structurally operatively associated with said linkage assembly, said motor assembly comprising:
        - a piston so constructed and arranged as to enable the alternate introduction of a pressure fluid to each one of a plurality of sides of said piston for enabling said motor assembly to move said linkage assembly between said positions;
    - a retaining assembly for introducing the aforesaid closing and releasing force;
    - said retaining assembly being so constructed and arranged as to require the aforesaid releasing force only during the initial portion of the travel of said linkage assembly as it is moved to said releasing position, and to introduce the aforesaid closing force only during the terminal portion of the travel of said linkage assembly as it is moved to said retaining position;
    - said retaining assembly comprises:
        - a toggle link pivotally structurally operatively associated with said linkage assembly;
        - said toggle link being pivotally movable between a plurality of positions, one of said positions corresponding to the aforesaid retaining position, in which said toggle link assumes a substantially horizontal disposition, and another of said positions corresponding to the aforesaid releasing position, in which said toggle link assumes a substantially vertical disposition; and
        - a camming surface;
    - said toggle link being abuttingly mutually cooperatively engageable with said camming surface only during the initial portion of the travel of said linkage assembly as it is moved to said releasing position, and only during the terminal portion of the travel of said linkage assembly as it is moved to said retaining position, to enable the introduction of the aforesaid closing and releasing force;
    - said camming surface and said toggle link being so contoured and arranged as to enable the link to assume the vertical during the initial portion of the travel of said linkage assembly to the aforesaid releasing position, further enabling a rapid decrease in the required aforesaid releasing force, and to enable the link to be moved from the vertical to the horizontal during the terminal portion of the travel of the linkage assembly to the aforesaid retaining position, further enabling a rapid increase in the required aforesaid closing force;
    - said linkage assembly being so constructed and arranged as to enable the introduction of a substantial mechanical advantage, further enabling said linkage assembly to develop the aforesaid closing and releasing forces.

28. A vessel particularly adapted to be used on a body of water for moving a load comprising any one of a substantial plurality of widely divergent materials between a plurality of locations, and for discharging said load at any selected one of said locations comprising, in combination:
- a plurality of complementary buoyant load carrying portions pivotally structurally operatively associated with one another;
- said load carrying force being so constructed, configured and arranged as to inherently tend to assume one of a plurality of positions in the absence of a load, and to inherently tend to assume another of said plurality of positions under the influence of a load;
- hydraulic asemblies structurally operatively associated with each of said portions for controlling the rate of movement thereof between each of the aforesaid plurality of positions, and for assisting in the retention of said portions at each of said positions, said hydraulic assemblies comprising:
    - locking structure structurally operatively associated with said load carrying portions for retaining said portions in the aforesaid one of said plurality of positions thereof;
    - said locking structure being so constructed and arranged as to be movable between a plurality of positions, one of said positions defining a retaining position corresponding to the aforesaid one position of said portions, and another of said positions defining a releasing position corresponding to the aforesaid other position of said portions;
    - said locking structure further being so constructed and arranged as to enable the introduction of a substantial closing force for bringing the load carrying portions into the aforesaid one position, and requiring a substantial releasing force to release the portions therefrom for enabling said locking structure to maintain and retain said load carrying portions in the aforesaid one position under substantially any and all conditions, and even under the influence of a load of substantial magnitude;
    - said locking structure comprises:
        - a linkage assembly that is so constructed and arranged as to be pivotally movable between the aforesaid retaining and releasing
positions;
a hydraulic motor assembly structurally operatively
associated with said linkage assembly, said motor
assembly comprising:
a piston so constructed and arranged as to enable
the alternate introduction of a pressure fluid
to each one of a plurality of sides of said piston for enabling said motor assembly to move
said linkage assembly between said positions;
a retaining assembly for introducing the aforesaid closing and releasing force;
said retaining assembly being so constructed and
arranged as to require the aforesaid releasing
force only during the initial portion of the travel
of said linkage assembly as it is moved to said
releasing position, and to introduce the aforesaid closing force only during the terminal portion of the travel of said linkage assembly as it
is moved to said retaining position;
said retaining assembly comprises:
a bifurcated link pivotally structurally operatively associated with said linkage assembly, having:
a beveled surface defining an angle with
the vertical; and
a mounting block having:
a beveled surface at one end thereof
defining an angle with the vertical
complementary with the angle defined
by the beveled surface of said link;
the beveled surface of said arm being
abuttingly mutually cooperatively engageable with the beveled surface of
said mounting block only during the
initial portion of the travel of said
linkage assembly as it is moved to said
releasing position, and only during the
terminal portion of the travel of said
linkage assembly as it is moved to said
retaining position, to enable the introduction of the aforesaid closing and
releasing force;
the angle of said beveled surfaces being
such as to enable a rapid decrease in
the releasing force during the aforesaid initial portion of the travel of said
linkage assembly, and to enable a
rapid decrease in the closing force during the aforesaid terminal portion of
the travel of said linkage assembly,
said linkage assembly being so constructed and arranged as to enable
the introduction of a substantial mechanical advantage, further enabling
said linkage assembly to develop the
aforesaid closing and releasing forces.

29. A vessel particularly adapted to be used on a body
of water for moving a load comprising any one of a
substantial plurality of widely divergent materials between a plurality of locations, and for discharging said
load at any selected one of said locations comprising, in
combination:
a plurality of complementary buoyant load carrying
portions pivotally structurally operatively associated
with one another;
said load carrying force being so constructed, configured and arranged as to inherently tend to assume
one of a plurality of positions in the absence of a
load, and to inherently tend to assume another of
said plurality of positions under the influence of a
load;
hydraulic assemblies structurally operatively associated
with each of said portions for controlling the rate of
movement thereof between each of the aforesaid
plurality of positions, and for assisting in the retention of said portions at each of said positions, said
hydraulic assemblies comprising:
locking structure structurally operatively associated with said load carrying portions for retaining said portions in the aforesaid one of
said plurality of positions thereof;
said locking structure being so constructed and arranged as to be movable between a plurality of
positions, one of said positions defining a retaining position corresponding to the aforesaid
other position of said portions;
said locking structure further being so constructed
and arranged as to enable the introduction of a
substantial closing force for bringing the load
carrying portions into the aforesaid one position, and requiring a substantial releasing force
to release the portions therefrom for enabling
said locking structure to maintain and retain
said load carrying portions in the aforesaid one
position under substantially any and all conditions, and even under the influence of a load of
substantial magnitude;
said locking structure comprises:
a retaining assembly for introducing the
aforesaid closing and releasing force;
said retaining asembly being pivotally movable between a plurality of positions, one of
said positions corresponding to the aforesaid retaining position, and another of said
positions corresponding to the aforeasid
releasing position, and comprising:
a toggle link;
said toggle link being pivotally movable
between a plurality of positions, one of
said positions corresponding to the
aforesaid retaining position, in which
said toggle link assumes a substantially horizontal disposition and another of said positions corresponding
to the aforesaid releasing position, in
which said toggle link assumes a substantially vertical disposition; and
a camming surface;
said toggle link being abuttingly mutually cooperatively engageable with
said camming surface only during the
initial portion of the travel of said
retaining assembly as it is moved to
the releasing position, and only during the terminal portion of the travel
of said retaining assembly as it is
moved to the retaining position, to enable the introduction of the aforesaid
closing and releasing force;
said camming surface and said toggle
link being so contoured and arranged
as to enable the link to assume the vertical during the initial portion of the
travel of the retaining assembly to the
aforesaid releasing position, further
enabling a rapid decrease in the required aforesaid releasing force, and
to enable the link to be moved from
the vertical to the horizontal during
the terminal portion of the travel of
the retaining assembly to the aforesaid retaining position, further enabling a rapid increase in the required
aforesaid closing force; and
a hydraulic motor assembly pivotally structurally operatively associated with said retaining assembly, said
motor assembly comprising:
a piston so constructed and arranged as to enable
the alternate introduction of a pressure fluid to each one of a plurality of sides of said piston for enabling said motor assembly to pivotally move said retaining assembly between the aforesaid plurality of positions thereof.

References Cited

UNITED STATES PATENTS

| | | | |
|---|---|---|---|
| 278,829 | 6/1883 | Stierle | 114—29 |
| 761,550 | 5/1904 | Simonton | 105—424 |
| 1,264,422 | 4/1918 | Moard | 91—42 |
| 1,603,439 | 10/1926 | Zarafu | 91—42 |
| 2,160,920 | 6/1939 | Strawn | 60—52 X |
| 2,333,316 | 11/1943 | Klossner | 60—52 X |
| 2,401,407 | 6/1946 | Benbow et al. | |
| 2,494,472 | 1/1950 | De Saussure. | |
| 2,618,121 | 11/1952 | Tucker | 60—52 |
| 2,836,461 | 5/1958 | Shadwick et al. | |
| 3,145,057 | 8/1964 | Taggart. | |
| 3,169,491 | 2/1965 | Darlington et al. | 105—424 X |
| 3,198,156 | 8/1965 | Kunz | 114—29 |

MILTON BUCHLER, *Primary Examiner.*

T. MAJOR, *Assistant Examiner.*